United States Patent
Suenderhauf et al.

(10) Patent No.: US 8,671,033 B2
(45) Date of Patent: Mar. 11, 2014

(54) ARCHITECTURAL DESIGN FOR PERSONNEL EVENTS APPLICATION SOFTWARE

(75) Inventors: Philipp Suenderhauf, Leimen (DE); Matthias Richter, Sinsheim (DE); Fabian Guenther, Mauer (DE); Jan Penning, Heidelberg (DE); Peter Latocha, Malsch (DE); Andreas Bold, Ludwigshafen (DE)

(73) Assignee: SAP AG, Walldorf (DE)

( * ) Notice: Subject to any disclaimer, the term of this patent is extended or adjusted under 35 U.S.C. 154(b) by 1621 days.

(21) Appl. No.: 11/967,890

(22) Filed: Dec. 31, 2007

(65) Prior Publication Data

US 2009/0171716 A1 Jul. 2, 2009

(51) Int. Cl.
*G07F 19/00* (2006.01)
*G06Q 10/00* (2012.01)

(52) U.S. Cl.
USPC .................................................. 705/30; 705/1

(58) Field of Classification Search
USPC .................................................. 705/30, 31
See application file for complete search history.

(56) References Cited

U.S. PATENT DOCUMENTS

| | | |
|---|---|---|
| 4,947,321 A | 8/1990 | Spence et al. |
| 5,550,734 A | 8/1996 | Tarter et al. |
| 5,560,005 A | 9/1996 | Hoover et al. |
| 5,586,312 A | 12/1996 | Johnson et al. |
| 5,632,022 A | 5/1997 | Warren et al. |
| 5,634,127 A | 5/1997 | Cloud et al. |
| 5,680,619 A | 10/1997 | Gudmundson et al. |
| 5,704,044 A | 12/1997 | Tarter et al. |
| 5,768,119 A | 6/1998 | Havekost et al. |
| 5,822,585 A | 10/1998 | Noble et al. |
| 5,832,218 A | 11/1998 | Gibbs et al. |
| 5,848,291 A | 12/1998 | Milne et al. |
| 5,867,495 A | 2/1999 | Elliott et al. |
| 5,881,230 A | 3/1999 | Christensen et al. |
| 5,893,106 A | 4/1999 | Brobst et al. |
| 5,918,219 A | 6/1999 | Isherwood |
| 5,987,247 A | 11/1999 | Lau |
| H001830 H | 1/2000 | Petrimoulx et al. |
| 6,028,997 A | 2/2000 | Leymann et al. |
| 6,049,838 A | 4/2000 | Miller et al. |

(Continued)

FOREIGN PATENT DOCUMENTS

| | | |
|---|---|---|
| WO | 00/23874 | 4/2000 |
| WO | WO 2004/083984 | 9/2004 |
| WO | WO 2005/114381 | 12/2005 |

OTHER PUBLICATIONS

Astudillo, H.; "How Conceptual System Architecture Leads to Business Process"; ACM; 2000; pp. 35-36.

(Continued)

*Primary Examiner* — Garcia Ade
(74) *Attorney, Agent, or Firm* — Fish & Richardson P.C.

(57) ABSTRACT

Methods, systems, and apparatuses, including computer program products, for implementing a software architecture design for a software application implementing personnel events functionality. The application is structured as multiple process components interacting with each other through service interfaces, and multiple service operations, each being implemented for a respective process component. The process components include a personnel administration process component, a payroll processing process component, an expense and reimbursement management process component, a time and labor process component, a compensation management process component, an employee payroll administration process component, and numerous country-specific employer regulatory compliance process components.

22 Claims, 20 Drawing Sheets

(56) References Cited

U.S. PATENT DOCUMENTS

| | | | |
|---|---|---|---|
| 6,070,197 A | 5/2000 | Cobb et al. | |
| 6,151,582 A | 11/2000 | Huang et al. | |
| 6,167,563 A | 12/2000 | Fontana et al. | |
| 6,167,564 A | 12/2000 | Fontana et al. | |
| 6,177,932 B1 | 1/2001 | Galdes et al. | |
| 6,182,133 B1 | 1/2001 | Horvitz | |
| 6,208,345 B1 | 3/2001 | Sheard et al. | |
| 6,272,672 B1 | 8/2001 | Conway | |
| 6,311,170 B1 | 10/2001 | Embrey | |
| 6,338,097 B1 | 1/2002 | Krenzke et al. | |
| 6,424,991 B1 | 7/2002 | Gish | |
| 6,434,740 B1 | 8/2002 | Monday et al. | |
| 6,442,748 B1 | 8/2002 | Bowman-Amuah | |
| 6,445,782 B1 | 9/2002 | Elfe et al. | |
| 6,446,045 B1 | 9/2002 | Stone et al. | |
| 6,446,092 B1 | 9/2002 | Sutter | |
| 6,473,794 B1 | 10/2002 | Guheen et al. | |
| 6,493,716 B1 | 12/2002 | Azagury et al. | |
| 6,571,220 B1 | 5/2003 | Ogino et al. | |
| 6,594,535 B1 | 7/2003 | Costanza | |
| 6,601,233 B1 | 7/2003 | Underwood | |
| 6,601,234 B1 | 7/2003 | Bowman-Amuah | |
| 6,606,744 B1 | 8/2003 | Mikurak | |
| 6,609,100 B2 | 8/2003 | Smith et al. | |
| 6,636,242 B2 * | 10/2003 | Bowman-Amuah | 715/764 |
| 6,671,673 B1 | 12/2003 | Baseman et al. | |
| 6,678,882 B1 | 1/2004 | Hurley et al. | |
| 6,687,734 B1 | 2/2004 | Sellink et al. | |
| 6,691,151 B1 | 2/2004 | Cheyer et al. | |
| 6,721,783 B1 | 4/2004 | Blossman et al. | |
| 6,738,964 B1 | 5/2004 | Zink et al. | |
| 6,747,679 B1 | 6/2004 | Finch et al. | |
| 6,750,885 B1 | 6/2004 | Finch et al. | |
| 6,764,009 B2 | 7/2004 | Melick et al. | |
| 6,789,252 B1 | 9/2004 | Burke et al. | |
| 6,847,854 B2 | 1/2005 | Discenzo | |
| 6,859,931 B1 | 2/2005 | Cheyer et al. | |
| 6,889,197 B2 | 5/2005 | Lidow | |
| 6,889,375 B1 | 5/2005 | Chan et al. | |
| 6,895,438 B1 | 5/2005 | Ulrich | |
| 6,904,399 B2 | 6/2005 | Cooper et al. | |
| 6,907,395 B1 | 6/2005 | Hunt et al. | |
| 6,954,736 B2 | 10/2005 | Menninger et al. | |
| 6,985,939 B2 | 1/2006 | Fletcher et al. | |
| 6,990,466 B1 | 1/2006 | Hu | |
| 7,003,474 B2 | 2/2006 | Lidow | |
| 7,020,697 B1 * | 3/2006 | Goodman et al. | 709/223 |
| 7,031,998 B2 | 4/2006 | Archbold | |
| 7,043,448 B2 | 5/2006 | Campbell | |
| 7,047,518 B2 | 5/2006 | Little et al. | |
| 7,050,056 B2 | 5/2006 | Meyringer | |
| 7,050,873 B1 | 5/2006 | Discenzo | |
| 7,055,136 B2 | 5/2006 | Dzoba et al. | |
| 7,058,587 B1 | 6/2006 | Horne | |
| 7,069,536 B2 | 6/2006 | Yaung | |
| 7,072,855 B1 | 7/2006 | Godlewski et al. | |
| 7,076,766 B2 | 7/2006 | Wirts et al. | |
| 7,117,447 B2 | 10/2006 | Cobb et al. | |
| 7,120,597 B1 | 10/2006 | Knudtzon et al. | |
| 7,120,896 B2 | 10/2006 | Budhiraja et al. | |
| 7,131,069 B1 | 10/2006 | Rush et al. | |
| 7,155,409 B1 | 12/2006 | Stroh | |
| 7,181,694 B2 | 2/2007 | Reiss et al. | |
| 7,184,964 B2 | 2/2007 | Wang | |
| 7,194,431 B1 | 3/2007 | Land et al. | |
| 7,197,740 B2 | 3/2007 | Beringer et al. | |
| 7,200,569 B2 | 4/2007 | Gallagher et al. | |
| 7,206,768 B1 | 4/2007 | deGroeve et al. | |
| 7,216,091 B1 | 5/2007 | Blandina et al. | |
| 7,219,107 B2 | 5/2007 | Beringer | |
| 7,222,786 B2 | 5/2007 | Renz et al. | |
| 7,225,240 B1 | 5/2007 | Fox et al. | |
| 7,249,044 B2 | 7/2007 | Kumar et al. | |
| 7,257,254 B2 | 8/2007 | Tunney | |
| 7,283,973 B1 | 10/2007 | Loghmani et al. | |
| 7,289,964 B1 * | 10/2007 | Bowman-Amuah | 705/1.1 |
| 7,293,254 B2 | 11/2007 | Bloesch et al. | |
| 7,299,970 B1 | 11/2007 | Ching | |
| 7,315,830 B1 | 1/2008 | Wirtz et al. | |
| 7,324,966 B2 | 1/2008 | Scheer | |
| 7,353,180 B1 | 4/2008 | Silverstone et al. | |
| 7,356,492 B2 | 4/2008 | Hazi et al. | |
| 7,367,011 B2 | 4/2008 | Ramsey et al. | |
| 7,370,315 B1 | 5/2008 | Lovell et al. | |
| 7,376,601 B1 | 5/2008 | Aldridge | |
| 7,376,604 B1 | 5/2008 | Butcher | |
| 7,376,632 B1 | 5/2008 | Sadek et al. | |
| 7,383,201 B2 | 6/2008 | Matsuzaki et al. | |
| 7,386,833 B2 | 6/2008 | Granny et al. | |
| 7,406,716 B2 | 7/2008 | Kanamori et al. | |
| 7,415,697 B1 | 8/2008 | Houlding | |
| 7,418,409 B1 | 8/2008 | Goel | |
| 7,418,424 B2 | 8/2008 | Martin et al. | |
| 7,448,022 B1 | 11/2008 | Ram et al. | |
| 7,451,432 B2 | 11/2008 | Shukla et al. | |
| 7,461,030 B2 | 12/2008 | Hibler et al. | |
| 7,467,198 B2 * | 12/2008 | Goodman et al. | 709/223 |
| 7,469,233 B2 | 12/2008 | Shooks et al. | |
| 7,516,088 B2 | 4/2009 | Johnson et al. | |
| 7,523,054 B2 | 4/2009 | Tyson-Quah | |
| 7,529,699 B2 | 5/2009 | Fuse et al. | |
| 7,536,325 B2 | 5/2009 | Randell et al. | |
| 7,536,354 B1 | 5/2009 | deGroeve et al. | |
| 7,546,520 B2 | 6/2009 | Davidson et al. | |
| 7,546,575 B1 | 6/2009 | Dillman et al. | |
| 7,565,640 B2 | 7/2009 | Shukla et al. | |
| 7,624,371 B2 | 11/2009 | Kulkarni et al. | |
| 7,631,291 B2 | 12/2009 | Shukla et al. | |
| 7,640,195 B2 | 12/2009 | Von Zimmermann et al. | |
| 7,640,291 B2 | 12/2009 | Maturana et al. | |
| 7,644,390 B2 | 1/2010 | Khodabandehloo et al. | |
| 7,657,406 B2 | 2/2010 | Tolone et al. | |
| 7,657,445 B1 | 2/2010 | Goux | |
| 7,665,083 B2 | 2/2010 | Demant et al. | |
| 7,668,761 B2 | 2/2010 | Jenkins et al. | |
| 7,672,888 B2 | 3/2010 | Allin et al. | |
| 7,681,176 B2 | 3/2010 | Wills et al. | |
| 7,693,586 B2 | 4/2010 | Dumas et al. | |
| 7,703,073 B2 | 4/2010 | Illowsky et al. | |
| 7,739,160 B1 | 6/2010 | Ryan et al. | |
| 7,742,985 B1 | 6/2010 | Digrigoli et al. | |
| 7,747,980 B2 | 6/2010 | Illowsky et al. | |
| 7,765,156 B2 | 7/2010 | Staniar et al. | |
| 7,765,521 B2 | 7/2010 | Bryant | |
| 7,788,145 B2 | 8/2010 | Wadawadigi et al. | |
| 7,797,698 B2 | 9/2010 | Diament et al. | |
| 7,814,142 B2 | 10/2010 | Mamou et al. | |
| 7,822,682 B2 | 10/2010 | Arnold et al. | |
| 7,835,971 B2 | 11/2010 | Stockton et al. | |
| 7,904,350 B2 | 3/2011 | Ayala et al. | |
| 7,925,985 B2 | 4/2011 | Moore | |
| 7,966,485 B2 * | 6/2011 | Chen et al. | 713/2 |
| 2002/0026394 A1 | 2/2002 | Savage et al. | |
| 2002/0042756 A1 | 4/2002 | Kumar et al. | |
| 2002/0049622 A1 | 4/2002 | Lettich et al. | |
| 2002/0073114 A1 | 6/2002 | Nicastro et al. | |
| 2002/0078046 A1 | 6/2002 | Uluakar et al. | |
| 2002/0082892 A1 | 6/2002 | Raffel et al. | |
| 2002/0103660 A1 | 8/2002 | Cramon et al. | |
| 2002/0107826 A1 | 8/2002 | Ramachandran et al. | |
| 2002/0120553 A1 | 8/2002 | Bowman-Amuah | |
| 2002/0133368 A1 | 9/2002 | Strutt et al. | |
| 2002/0138281 A1 | 9/2002 | Cirulli et al. | |
| 2002/0138358 A1 | 9/2002 | Scheer | |
| 2002/0143598 A1 | 10/2002 | Scheer | |
| 2002/0156695 A1 | 10/2002 | Edwards | |
| 2002/0161907 A1 | 10/2002 | Moon | |
| 2002/0184111 A1 | 12/2002 | Swanson | |
| 2002/0188486 A1 | 12/2002 | Gil et al. | |
| 2002/0198798 A1 | 12/2002 | Ludwig et al. | |
| 2002/0198828 A1 | 12/2002 | Ludwig et al. | |
| 2003/0009754 A1 | 1/2003 | Rowley et al. | |
| 2003/0069774 A1 | 4/2003 | Hoffman et al. | |
| 2003/0074271 A1 | 4/2003 | Viswanath et al. | |

(56) References Cited

U.S. PATENT DOCUMENTS

| | | |
|---|---|---|
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0111304 A1 | 6/2004 | Meka et al. |
| 2004/0128180 A1 | 7/2004 | Abel et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0222896 A1 | 10/2005 | Rhyne et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0262192 A1 | 11/2005 | Mamou et al. |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156430 A1 | 7/2007 | Kaetker et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Moosmann et al. |
| 2007/0233541 A1 | 10/2007 | Schorr et al. |
| 2007/0233574 A1 | 10/2007 | Koegler et al. |
| 2007/0233575 A1 | 10/2007 | Berger et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265862 A1 | 11/2007 | Freund et al. |
| 2008/0004929 A9 | 1/2008 | Raffel et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2009/0037287 A1 | 2/2009 | Baitalmal et al. |
| 2009/0037492 A1 | 2/2009 | Baitalmal et al. |
| 2009/0189743 A1 | 7/2009 | Abraham et al. |
| 2009/0192858 A1 | 7/2009 | Johnson |
| 2010/0070324 A1 | 3/2010 | Bock et al. |
| 2010/0070336 A1 | 3/2010 | Koegler et al. |

OTHER PUBLICATIONS

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.

Ferguson D.F, et al.; "Service-Oriented Architecture: Programming Model and Product Architecture"; IBM Systems journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722): Oct. 2005; pp. 70-95.

Linthicum D.S.; "Chapter 9: RPCs Messaging, and B2B Application Integration"; B2B Application Integration; E-Business Enable Your Enterprise; 2001; pp. 167-181.

Nori A.K. et al.; "Composite Applications: Process Based Application Development", Lecture Notes in Computer Science; vol. 2444; Aug. 2003; pp. 48-53.

(56) References Cited

OTHER PUBLICATIONS

Pilhofer, F.; "Writing and Using CORBA Components"; Apr. 2002; http://www.fpx.de/MicoCCM/download/mico-com.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]: Sep. 2003 pp. 1-2; http://www.sap.com/belux/platform/netweaver/pdf/BWP_CAF.pdf.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Thomas, A.; "Enterprise JavaBeans Seer Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com.docs/VCAB_datasheet.pdf.

Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614: Mar. 16, 2007; 7 pages.

International Preliminary Report on Patentability issued in International Application No. PCT/US2006/012614; Jul. 1, 2008; 6 pages.

International Search Report and Written Opinion of the International Searching Authority issued in International Application No. PCT/EP2006/012618; Apr. 3, 2007; 8 pages.

International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.

International Preliminary Report on Patentability issued in International Application No. PCT/EP2006/012613; Jul. 1, 2008; 6 pages.

International Search Report and Written Opinion of the International Searching Authority issued in International Application No. PCT/EP2006/012624; Mar. 30, 2007; 9 pages.

International Preliminary Report on Patentability issued in International Application No. PCT/EP2006/012624; Jul. 1, 2008; 8 pages.

International Search Report and Written Opinion of the International Searching Authority issued in International Application No. PCT/EP2006/012623; May 7, 2007; 8 pages.

International Preliminary Report on Patentability issued in International Application No. PCT/EP2006/012623; Jul. 1, 2008; 7 pages.

International Search Report and Written Opinion of the International Searching Authority issued in International Application No. PCT/EP2006/012620; Mar. 21, 2007; 7 pages.

International Preliminary Report on Patentability issued in International Application No. PCT/EP2006/012620; Jul. 1, 2008; 6 pages.

International Search Report and Written Opinion of the International Searching Authoirty issued in International Application No. PCT/EP2006/012619; Apr. 19, 2007; 8 pages.

International Preliminary Report on Patentability issued in International Application No. PCT/EP2006/012619; Jul. 1, 2008; 7 pages.

International Search Report and Written Opinion of the International Searching Authority issued in International Application No. PCT/EP2006/012621; Apr. 19, 2007; 8 pages.

International Preliminary Report on Patentability issued in International Application No. PCT/EP2006/012621; Jul. 1, 2008; 7 pages.

International Search Report and Written Opinion of the International Searching Authority Issued in International Application No. PCT/EP2007/002835; Aug. 9, 2007; 12 pages.

International Preliminaiy Report on Patentability issued in International Application No. PCT/EP2007/002835; Sep. 30, 2008; 8 pages.

Communication Pursuant to Article 94(3) EPC issued in European Application No. 06841224.6; May 15, 2009; 8 pages.

Communication Pursuant to Article 94(3) EPC issued in European Application No. 06847009.5; May 15, 2009; 10 pages.

Communication Pursuant to Article 94(3) EPC issued in European Application No. 07007130.3; Dec. 5, 2008; 6 pages.

Extended European Search Report issued in European Application No. 07007130.3; Oct. 5, 2007, 6 pages.

Office Action issued in U.S. Appl. No. 11/323,041; Apr. 30, 2009; 26 pages.

Office Action issued in U.S. Appl. No. 11/322,612; May 11, 2009; 24 pages.

Office Action issued in U.S. Appl. No. 11/322,772; Mar. 25, 2009; 12 pages.

Office Action issued in U.S. Appl. No. 11/323,590; Jan. 9, 2009; 23 pages.

Office Action issued in U.S. Appl. No. 11/396,288; Jan. 2, 2009; 18 pages.

Office Action issued in U.S. Appl. No. 11/396,288; Apr. 15, 2008; 26 pages.

Deimel, A., "The SAP R/3 Business Framework", *Software—Concepts & Tools*, Springer-Verlag USA, vol. 19, No. 1 (1998), pp. 29-36.

Aleksy, M. et al., "Interoperability of Java-Based Applications and SAP's Business Framework State of the Art and Desirable Developments", Proceedings of the International Symposium on Edinburgh, UK, Sep. 1999, Los Alamitos, CA, USA, *IEEE Comput. Soc.*, US, (Sep. 5, 1999), pp. 190-200.

Kozaczynski, W., "Architecture Framework for Business Components", Software Reuse 1998, Proceedings, Fifth International Conference on Victoria, BC, Canada, Jun. 2-5, 1998, Los Alamitos, CA, USA, *IEEE Comput. Soc.*, US, (Jun. 2, 1998), pp. 300-307.

Arch-Int, S. et al., "Development of industrial information systems on the Web using business components", *Computers in Industry*, vol. 60 (2003). pp. 231-250.

Kythe, D.K., "The Promise of Distributed Business Components", *Bell Labs Technical Journal*, Wiley, CA, US, vol. 75, No. 2 (Mar./Apr. 1999), pp. 20-28.

Schmid, H.A., "Business Entity Components and Business Process Components",*Joop*, vol. 12, No. 6 (Oct. 1999), pp. 6-10, 12-15.

Fellner, K.J. et al., "Classification Framework for Business Components", System Sciences, 2000. Proceedings of the 33$^{rd}$ Annual Hawaii International Conference on Jan. 4-7, 2000, Piscataway, NJ, USA, IEEE, (Jan. 2000), pp. 3239-3248.

Gessford, J.E., "Object-Oriented System Design", Emerging Information Technologies for Competitive Advantage and Economic Development. Proceedings of 1992 Information Resources Management Association International Conference Idea Group Publishing Harrisburg, PA, USA (1992), pp. 110-118.

Anon.; "Sequent Corp Bell Atlantic; Bell Atlantic Selects Sequent for Video-on-Demand Program; Sequent Moves to Sieze Opportunity in New Market"; Business Wire; Dec. 6, 1994.

Anon.; "State of the Art Reports 13,000 MAS 90 for Windows Shipments in First Nine Months of Availability"; PR Newswire; Apr. 28,1997.

Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.

Avery, S.; "Buyers' Guide to Software for Purchasing 2000.(Directory)"; Purchasing, vol. 129, No. 1; p. 179; Jul. 13, 2000.

(56) References Cited

OTHER PUBLICATIONS

Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
Due et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
"Hudson's Bay Company Realizes Fast ROI with the Oracle E-Business Suite"; PR Newswire; New York; Jan. 15, 2002; p. 1.
Lambert et al.; "Supply Chain Metrics", International Journal of Logistics Management; vol. 12, No. 1; 2001; pp. 1-19.
mySAP™ ERP 2005; Downloaded Mar. 24, 2010 from <http://web.archive.org/web/2006110421205/www.sap.com/solutions/business-suite/erp/pdf/BWP_mySAP_ERP_2005.pdf>; 60 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al., "Designing and Architecturing Process-aware Web Applications with EPML"; SAC'08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
"Time Management with mySAP™ ERP Human Capital Management"; Downloaded Mar. 24, 2010 from <http://web.archive.org/web/20060105084834/ www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958>41 pages.
International Search Report and Written Opinioin of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Office Action issued in U.S. Appl. No. 11/322,772; Dec. 9, 2009; 14 pages.
Office Action issued in U.S. Appl. No. 11/322,398 on Apr. 2, 2010; 39 pages.
Office Action issued in U.S. Appl. No. 11/322,383; Nov. 12, 2009; 29 pages.
Office Action issued in U.S. Appl. 11/322,382 on Mar. 29, 2010; 28 pages.
Office Action issuedi n U.S. Appl. No. 11/323,041 on Mar. 19, 2010; 26 pages.
Notice of Allowance issued in U.S. Appl. No. 11/396,259 on Mar. 29, 2010; 19 pages.
Office Action issued in U.S. Appl. No. 11/396,288; Aug. 19, 2009; 20 pages.
Office Action issued in U.S. Appl. No. 11/396,258; Nov. 25, 2009; 9 pages.
Notice of Allowance issued in U.S. Appl. No. 11/396,258 on Mar. 31, 2010; 9 pages.
Office Action issued in U.S. Appl. No. 11/396,236 on Mar. 31, 2010; 20 pages.
Office Action issued in U.S. Appl. No. 11/323,039; Sep. 4, 2009: 36 pages.
Office Action issued in U.S. Appl. No. 11/322,851; Sep. 2, 2009; 32 pages.
Office Action issued in U.S. Appl. No. 11/323,040; Jul. 24, 2009; 35 pages.
Office Action issued in U.S. Appl. No. 11/322,612; Apr. 1, 2010; 23 pages.
Office Action issued in U.S. Appl. No. 11/397,026; Jul. 21, 2009; 28 pages.
Notice of Allowance issued in U.S. Appl. No. 11/397,026 on Mar. 29, 2010; 17 pages.
Notice of Allowance, issued in U.S. Appl. No. 11/967,865 on Mar. 31, 2010; 16 pages.
Office Action issued in U.S. Appl. No. 11/322,482; Jan. 7, 2010; 19 pages.
Office Action issued in U.S. Appl. No. 11/323,590; Jul. 10, 2009; 32 pages.
Office Action issued in U.S. Appl. No. 11/323,590; Dec. 30, 2009; 31 pages.
Office Action issued in U.S. Appl. No. 11/323,634; Sep. 10, 2009; 15 pages.
Office Action issued in U.S. Appl. No. 11/323,634; Apr. 2, 2010; 9 pages.
Office Action issued in U.S. Appl. No. 11/322,816; Jul. 23, 2009; 41 pages.
Office Action issued in U.S. Appl. No. 12/333,085; Jun. 25, 2009; 9 pages.
Office Action issued in U.S. Appl. No. 12/333,085; Mar. 23. 2010; 5 pages.
"American Software Announces ASP Pricing Model for It's a-Applications Expense Business Solution"; PR Newswire; Mar. 6, 2000; 2 pages.
Bin et al.; "Component Model Optimization for Distributed Real-Time Embedded Software"; IEEE International Conference on Systems, Man and Cybernetics; Oct. 13, 2004; 6 pages.
Cascallar, Eduardo et al.; "Assessment in the Evaluation of Self-Regulation as a Process"; Educational Psychology Review; vol. 18, No. 3; Sep. 2006; pp. 297-306.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cool, David W.; "Activity Fund Accounting"; School Business Affairs; vol. 49, No. 6; Jun. 1983; pp. 50-52.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Finin et al.; "KQML as an Agent Communication Language"; retrieved on Jul. 26, 2011; pp. 456-463. <http://portal.acm.org/citation.cfm?id=191322>.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.

(56) References Cited

OTHER PUBLICATIONS

Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.

Kalakota et al.; "Readings in Electronic Commerce"; Addison-Wesley Longman, Inc.; 1995; ISBN: 0-201-88060-1.

Lambert et al.; "Supply Chain Metrics"; International Journal of Logistics Management; vol. 12, No. 1; 2001; pp. 1-19.

Lockamy III, et al.; "Linking SCOR Planning Practices to Supply Chain Performance"; International Journal of Operations & Production Management; vol. 24, No. 12; 2004; pp. 1192-1218.

"Oracle Expands E-Commerce Offerings with the Acquisition of E-Travel, Inc."; PR Newswire; Mar. 9, 1999; 3 pages.

Orsburn; "Spares Management Handbook"; McGrawHill; 1991; ISBN: 0-8306-7626-0.

Papazoglou et al; "Service-Oriented Computing Research Road Map"; http://infolab.uvt.nl/pub/papazogloump-2006-96.pdf; Mar. 1, 2006; 29 pages.

SAP AG; "SAP NetWeaver Visual Composer: User Guide (SAP NetWeaver Visual Composer release 6.0)"; Document version 1.1; 2004; pp. 1-208.

SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.

Stephens, S.; "Supply Chain Council & Supply Chain Operations Reference (SCOR) Model Overview"; <http://www.supply-chain.org>; Version 5.0a; Aug. 2001; 29 pages.

Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.

Strelich, Thomas P. et al.; "Simulation-Based Transformation with the Service Integration/Interoperation Infrastructure"; Technology Review Journal; Fall/Winter 2005; pp. 99-115.

Office Action issued in U.S. Appl. No. 11/396,312 on Sep. 10, 2010; 23 pages.

Office Action issued in U.S. Appl. No. 11/322,611 on Sep. 16, 2010; 21 pages.

Office Action issued in U.S. Appl. No. 11/322,772; Jul. 12, 2010; 18 pages.

Office Action issued in U.S. Appl. No. 11/322,383; May 12, 2010; 23 pages.

Advisory Action issued in U.S. Appl. No. 11/323,041 on Jun. 7, 2010; 3 pages.

Office Action issued in U.S. Appl. No. 11/396,236 on Oct. 28, 2010; 19 pages.

Office Action issued in U.S. Appl. No. 11/323,039; Apr. 14, 2010; 15 pages.

Advisory Action issued in U.S. Appl. No. 11/322,612; Jun. 24, 2010; 3 pages.

Notice of Allowance issued in U.S. Appl. No. 12/233,554 on May 14, 2010; 11 pages.

Notice of Allowance issued in U.S. Appl. No. 12/233,554 on Sep. 17, 2010; 10 pages.

Notice of Allowance issued in U.S. Appl. No. 12/233,554 on Feb. 22, 2011; 7 pages.

Notice of Allowance issued in U.S. Appl. No. 12/233,554 on Jun. 27, 2011; 7 pages.

Office Action issued in U.S. Appl. No. 12/233,550 on Jan. 12, 2011; 29 pages.

Notice of Allowance issued in U.S. Appl. No. 12/233,550 on May 11, 2011; 20 pages.

Office Action issued in U.S. Appl. No. 12/333,146 on Sep. 6, 2011; 21 pages.

Notice of Allowance issued in U.S. Appl. No. 11/322,482; Jul. 13, 2010; 5 pages.

Office Action issued in U.S. Appl. No. 11/323,590; Jun. 21, 2010; 25 pages.

Office Action issued in U.S. Appl. No. 11/323,634 on Apr. 29, 2011; 8 pages.

Office Action issued in U.S. Appl. No. 11/322,816; Apr. 15, 2010; 27 pages.

Office Action issued in U.S. Appl. No. 11/322,973 on Dec. 7, 2010; 13 pages.

Office Action issued in U.S. Appl. No. 11/322,973 on May 27, 2011; 15 pages.

Office Action issued in U.S. Appl. No. 11/396,327 on Apr. 1, 2010; 26 pages.

Notice of Allowance issued in U.S. Appl. No. 11/396,327 on Nov. 30, 2010; 28 pages.

Office Action issued in U.S. Appl. No. 11/404,147 on Nov. 24, 2010; 27 pages.

Office Action issued in U.S. Appl. No. 11/404,147 on Aug. 4, 2011; 26 pages.

Notice of Allowance issued in U.S. Appl. No. 12/233,462 on Feb. 2, 2011; 11 pages.

Notice of Allowance issued in U.S. Appl. No. 12/233,462 on May 18, 2011; 6 pages.

Notice of Allowance issued in U.S. Appl. No. 12/233,462 on Sep. 2, 2011; 7 pages.

Office Action issued in U.S. Appl. No. 12/233,457 on May 26, 2011; 19 pages.

Office Action issued in U.S. Appl. No. 11/967,483 on Aug. 20, 2010; 10 pages.

Office Action issued in U.S. Appl. No. 11/967,483 on Mar. 4, 2011; 6 pages.

Office Action issued in U.S. Appl. No. 12/327,232 on May 26, 2011; 20 pages.

Office Action issued in U.S. Appl. No. 12/327,590 on Jun. 23, 2011; 16 pages.

Notice of Allowance issued in U.S. Appl. No. 12/333,085; Sep. 13, 2010; 8 pages.

Office Action issued in U.S. Appl. No. 12/233,087 on Aug. 18, 2011; 42 pages.

Notice of Allowance issued in U.S. Appl. No. 12/233,534 on Jun. 24, 2010; 15 pages.

Notice of Allowance issued in U.S. Appl. No. 12/233,534 on Oct. 20, 2010; 15 pages.

Notice of Allowance issued in U.S. Appl. No. 12/233,534 on Jan. 31, 2011; 15 pages.

Notice of Allowance issued in U.S. Appl. No. 12/233,534 on May 16, 2011; 12 pages.

Notice of Allowance issued in U.S. Appl. No. 11/322,382 on Sep. 20, 2010; 6 pages.

Notice of Allowance issued in U.S. Appl. No. 11/322,382 on Jan. 6, 2011; 7 pages.

Notice of Allowance issued in U.S. Appl. No. 11/322,382 on Jul. 25, 2011; 5 pages.

Notice of Allowance issued in U.S. Appl. No. 11/322,610 on Jun. 14, 2010; 6 pages.

Notice of Allowance issued in U.S. Appl. No. 11/322,610 on Sep. 23, 2010; 6 pages.

Notice of Allowance issued in U.S. Appl. No. 11/322,610 on Dec. 22, 2010; 6 pages.

Notice of Allowance issued in U.S. Appl. No. 11/322,610 on Mar. 31, 2011; 6 pages.

Notice of Allowance issued in U.S. Appl. No. 11/322,398 on Jul. 23, 2010; 38 pages.

Notice of Allowance issued in U.S. Appl. No. 11/322,398 on Oct. 29, 2010; 18 pages.

Notice of Allowanced issued in U.S. Appl. No. 11/322,398 on Nov. 15, 2010; 20 pages.

Notice of Allowanced issued in U.S. Appl. No. 11/322,398 on May 27, 2011; 21 pages.

Notice of Allowance issued in U.S. Appl. No. 11/396,259 on Jul. 6, 2010; 6 pages.

Notice of Allowance issued in U.S. Appl. No. 11/396,259 on Oct. 15, 2010; 6 pages.

Notice of Allowance issued in U.S. Appl. No. 11/396,259 on Jan. 20, 2011; 6 pages.

(56) References Cited

OTHER PUBLICATIONS

Notice of Allowance issued in U.S. Appl. No. 11/396,259 on Aug. 5, 2011; 7 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Notice of Allowance issued in U.S. Appl. No. 11/396,288; May 20, 2010; 15 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Supplemental Notice of Allowance issued in U.S. Appl. No. 11/396,258 on May 19, 2010; 8 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Notice of Allowance issued in U.S. Appl. No. 11/396,258 on Jun. 28, 2011; 9 pages.
Office Action issued in U.S. Appl. No. 11/322,851; May 12, 2010; 15 pages.
Notice of Allowance issued in U.S. Appl. No. 11/322,851 on Sep. 2, 2011; 8 pages.
Office Action issued in U.S. Appl. No. 11/322,845; Jul. 15, 2010; 16 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040; Apr. 29, 2010; 17 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Sep. 7, 2010; 11 pages.
Notice of Allowance issued in U.S. Appl. No. 11/968,054 on Aug. 2, 2011; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 11/967,489 on Sep. 28, 2011; 7 pages.
Office Action issued in U.S. Appl. No. 12/233,557 on Sep. 16, 2010; 16 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 o n Apr. 15, 2011; 12 pages.
Notice of Allowance issued in U.S. Appl. No. 12/327,354 on Jun. 25, 2010; 16 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Oct. 6, 2010; 6 pages.
Notice of Allowance issued in U.S. Appl. No. 11/967,865 on Jun. 24, 2011; 8 pages.

\* cited by examiner

US 8,671,033 B2

ARCHITECTURAL DESIGN FOR PERSONNEL EVENTS APPLICATION SOFTWARE

BACKGROUND

The subject matter of this patent application relates to computer software architecture and, more particularly, to the architecture of application software for personnel events.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a personnel events software application.

In its various aspects, the software architecture design can be implemented as methods, systems, and apparatuses, including computer program products, for implementing a software architecture design for a software application implementing service procurement. The software application is structured as multiple process components interacting with each other through service interfaces, and multiple service operations, each being implemented for a respective process component. The process components include a Payroll Processing process component, a Time and Labor Management process component, a Compensation Management process component, an Employee Payroll Administration process component, a DE Employer Regulatory Compliance process component, a US Employer Regulatory Compliance process component, a CN Employer Regulatory Compliance process component, an FR Employer Regulatory Compliance process component, a GB Employer Regulatory Compliance process component, an IT Employer Regulatory Compliance process component, an AU Employer Regulatory Compliance process component, a CA Employer Regulatory Compliance process component, a DK Employer Regulatory Compliance process component, an NL Employer Regulatory Compliance process component, a SG Employer Regulatory Compliance process component, a ZA Employer Regulatory Compliance process component, a Personnel Administration process component, an Expense and Reimbursement Management process component, a Business Partner Data Management process component, a Human Capital Master Data Management process component, and an Identity Management process component.

In its various aspects, the software architecture design can further be implemented as methods, systems, and apparatuses, including computer program products, implementing a software architecture design for a software application that is adapted to interact with external software systems through the service operations described in reference to external process components, or a subcombination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

DETAILED DESCRIPTION

Figure 1:
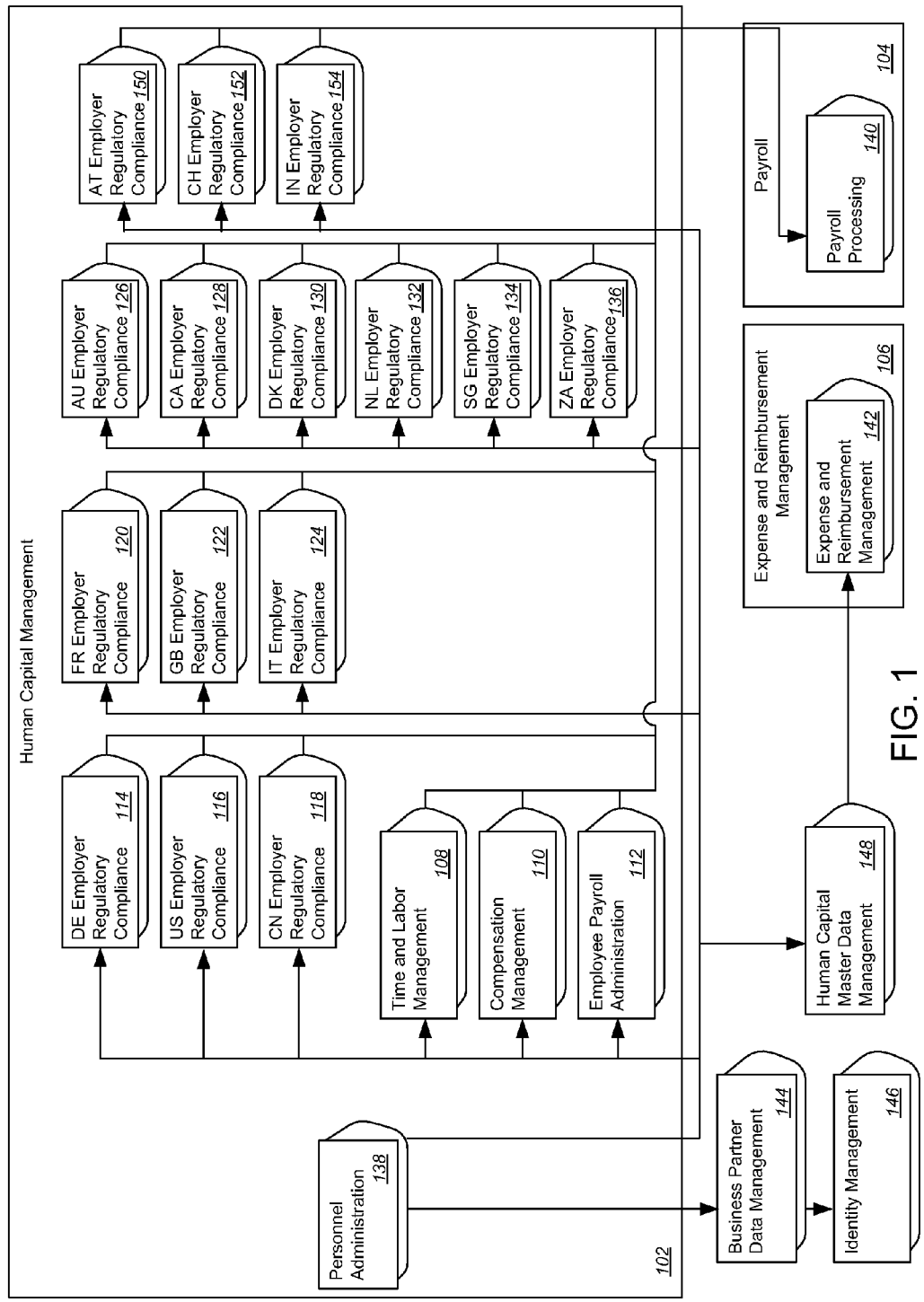
FIG. 1 is a block diagram of a personnel events software application.

FIG. 1 shows the software architectural design for a personnel events software application. As shown in FIG. 1, the personnel events design includes a Human Capital Management deployment unit 102, a Payroll deployment unit 104, and an Expense and Reimbursement Management deployment unit 106.

The Human Capital deployment unit 102 handles the management of employee-related processes in a company, such as personnel administration, time and labor management, and compensation management. The deployment unit 102 includes a Time and Labor Management process component 108, a Compensation Management process component 110, an Employee Payroll Administration process component 112, a DE Employer Regulatory Compliance process component 114, a US Employer Regulatory Compliance process component 116, a CN Employer Regulatory Compliance process component 118, an FR Employer Regulatory Compliance process component 120, a GB Employer Regulatory Compliance process component 122, an IT Employer Regulatory Compliance process component 124, an AU Employer Regulatory Compliance process component 126, a CA Employer Regulatory Compliance process component 128, a DK Employer Regulatory Compliance process component 130, an NL Employer Regulatory Compliance process component 132, an SG Employer Regulatory Compliance process component 134, a ZA Employer Regulatory Compliance process component 136, a Personnel Administration process component 138, an AT Employer Regulatory Compliance process component 150, a CH Employer Regulatory Compliance process component 152, and an IN Employer Regulatory Compliance process component 154.

The Time and Labor Management process component 108 handles the management of employees' planned working times and the recording and valuation of work performed and absence times. The Compensation Management process component 110 handles the planning and specification of compensation data for employees using appropriate reward strategies, which are based on predefined compensation structures and components. The Employee Payroll Administration process component 112 handles the administration of the employee specific payroll agreement and the overview of completed and planned payroll processes.

The DE Employer Regulatory Compliance process component 114 handles the administration of employee data and reporting to authorities that employers in Germany are legally obligated to perform. The US Employer Regulatory Compliance process component 116 handles the administration of employee data and reporting to authorities that employers in the United States of America are legally obligated to perform. The CN Employer Regulatory Compliance process component 118 handles the combination of reporting and other administrative activities that employers in China, with respect to employees, are legally obligated to perform. The FR Employer Regulatory Compliance process component 120 handles the administration of employee data and reporting to authorities that employers in France are legally obligated to perform. The GB Employer Regulatory Compliance process component 122 handles the administration of employee data and reporting to authorities that employers in the United Kingdom are legally obligated to perform. The IT Employer Regulatory Compliance process component 124 handles the administration of employee data and reporting to authorities that employers in Italy are legally obligated to perform. The AU Employer Regulatory Compliance process component 126 handles the combination of activities an employer in Australia is obliged to perform with respect to employees. The CA Employer Regulatory Compliance process component 128 handles the combination of activities an employer in Canada is obliged to perform with respect to employees. The DK Employer Regulatory Compliance process component 130 handles the combination of reporting and other administrative activities that an employer in Denmark is obliged to perform with respect to employees. The NL Employer Regulatory Compliance process component 132 handles the combination of activities an employer in Netherlands is obliged to perform with respect to employees. The SG Employer Regulatory Compliance process component 134 handles the combination of activities an employer in Singapore is obliged to perform with respect to employees. The ZA Employer Regulatory Compliance process component 136 handles the combination of activities an employer in South Africa is obliged to perform with respect to employees. The AT Employer Regulatory Compliance process component 150 handles the combination of activities an employer in Austria is obliged to perform with respect to employees. The CH Employer Regulatory Compliance process component 152 handles the combination of activities an employer in Switzerland is obliged to perform with respect to employees. The IN Employer Regulatory Compliance process component 154 handles the combination of activities an employer in India is obliged to perform with respect to employees. The Personnel Administration process component 138 handles the administration of personnel changes concerning employee master data and work agreements.

The Payroll deployment unit 104 handles the collection of payroll-relevant data from events such as the hiring or transfer of an employee, changes to remuneration, time recording, and settlement of expenses. The deployment unit 104 includes a Payroll Processing process component 140 which handles the execution and monitoring of regular as well as off-cycle payroll processes, such as completeness checks of payroll relevant employee data, the payroll run itself, verification of the results and the transfer to financial accounting.

The Expense and Reimbursement Management deployment unit 106 includes an Expense and Reimbursement Management process component 142 which handles the management and monitoring of expenses incurred by employees, and the reimbursement of such expenses to employees.

A Business Partner Data Management process component 144 handles the management of the business partner master data for the company. This data includes the information needed to describe the rights and obligations of a business partner participating in various business processes, such as sales, purchasing, and accounting processes.

An Identity Management process component 146 deals with identifying individuals in a system landscape and controlling their access by associating user rights and restrictions.

A Human Capital Master Data Management process component 148 handles the management of work agreements, employments, and human capital master data used in different HCM areas.

Figure 2:
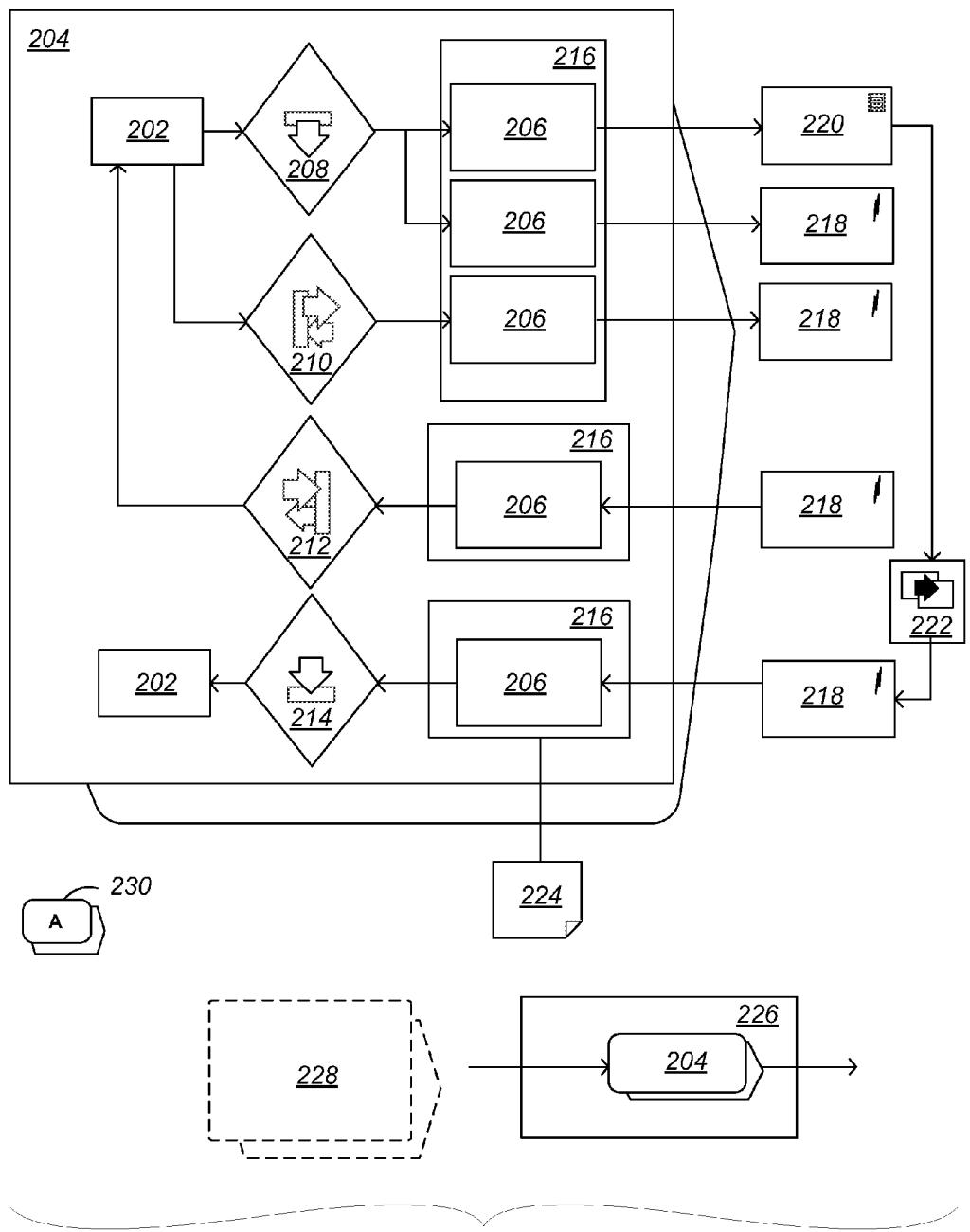
FIG. 2 illustrates the elements of the architecture as they are drawn in the figures.

FIG. 2 illustrates the elements of the architecture as they are drawn in the figures of this patent application. The elements of the architecture include the business object 202, the process component 204, the operation 206, the outbound process agent 208, the synchronous outbound process agent 210, the synchronous inbound process agent 212, the inbound process agent 214, the service interface or interface 216, the message 218, the form message 220, the mapping entity 222, the communication channel template 224, and the deployment unit 226.

Not explicitly represented in the figures is a foundation layer that contains all fundamental entities that are used in multiple deployment units 226. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

A process component of an external system is drawn as a dashed-line process component 228. Such a process component 228 represents the external system in describing interactions with the external system; however, the process component 228 need not represent more of the external system than is needed to produce and receive messages as required by the process component that interacts with the external system.

The connector icon 230 is used to simplify the drawing of interactions between process components 204. Interactions between process component pairs 204 involving their respective business objects 202, process agents (at 208, 210, 212, and 214), operations 206, interfaces 216, and messages (at 218 and 22) are described as process component interactions, which determine the interactions of a pair of process components across a deployment unit boundary, i.e., from one deployment unit 226 to another deployment unit 226. Interactions between process components 204 are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components 204, but interfaces 216, process agents (at 208, 210, 212, and 214), and business objects 202 that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component 204 is described as being contained in a deployment unit 226. It should be understood, however, that such operational inclusion can be realized in a variety of ways and is not limited to a physical inclusion of the entirety of one element in another.

The architectural elements include the business object 202. A business object 202 is a representation of a type of a uniquely identifiable business entity (an object instance) described by a structural model. Processes operate on business objects. This example business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component 204, is an object that encapsulates transactional data (i.e., data that is valid for a point in time). The term business object will be used generically to refer to a business process object and a master data object, unless the context requires otherwise. Properly implemented, business objects 202 are implemented free of redundancies.

The architectural elements also include the process component 204. A process component 204 is a software package that realizes a business process and generally exposes its functionality as services. The functionality includes the ability to perform all or parts of particular kinds of business transactions. A process component 204 contains one or more semantically related business objects 202. Any business object belongs to no more than one process component. Process components can be categorized as a standard process component, a process component at a business partner, a third party process component, or a user centric process component. The standard process component (named simply process component) is a software package that realizes a business process and exposes its functionality as services. The process component at a business partner is a placeholder for a process component (or other technology that performs the essential functions of the process component) used at a business partner. The third party process component is a process component (or other technology that performs the essential functions of the process component) provided by a third party. The user centric process component is a process component containing user interface parts.

Process components 204 are modular and context-independent. That they are context-independent means that a process component 204 is not specific to any specific application and is reusable. The process component 204 is often the smallest (most granular) element of reuse in the architecture.

The architectural elements also include the operation 206. An operation 206 belongs to exactly one process component 204. A process component 204 generally is able to perform multiple operations 206. Operations 206 can be synchronous or asynchronous, corresponding to synchronous or asynchronous process agents (e.g. at 208, 210, 212, and 214), which will be described below. Operation 206 may be the smallest, separately-callable function, described by a set of data types used as input, output, and fault parameters serving as a signature.

The architectural elements also include the service interface 216, referred to simply as the interface. An interface 216 is a named group of operations 206. Interface 216 typically specifies inbound service interface functionality or outbound service interface functionality. Each operation 206 belongs to exactly one interface 216. An interface 216 belongs to exactly one process component 204. A process component 204 might contain multiple interfaces 216. In some implementations, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations 206 directed to the same other process component 204 are in one interface 216.

The architectural elements also include the message 218. Operations 206 transmit and receive messages 218. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component. In some implementations, the message is a form based message 220 that can be translated into a recognized format for an external process component 228. The form message type 220 is a message type used for documents structured in forms. The form message type 220 can be used for printing, faxing, emailing, or other events using documents structured in forms. In some implementations, the form message type 220 provides an extended signature relative to the normal message type. For example, the form message type 220 can include text information in addition to identification information to improve human reading.

The architectural elements also include the process agent (e.g. at 208, 210, 212, and 214). Process agents do business processing that involves the sending or receiving of messages 218. Each operation 206 will generally have at least one associated process agent. The process agent can be associated with one or more operations 206. Process agents (at 208, 210, 212, and 214) can be either inbound or outbound, and either synchronous or asynchronous.

Asynchronous outbound process agents 208 are called after a business object 202 changes, e.g., after a create, update, or delete of a business object instance. Synchronous outbound process agents 210 are generally triggered directly by a business object 202.

An outbound process agent (208 and 210) will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents (212 and 214) are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents (210 and 212) are used when a process component requires a more or less immediate response from another process component, and is waiting for that response to continue its work.

Operations and process components are described in this specification in terms of process agents. However, in alternative implementations, process components and operations can be implemented without use of agents by using other conventional techniques to perform the functions described in this specification.

The architectural elements also include the communication channel template. The communication channel template is a modeling entity that represents a set of technical settings used for communication. The technical settings can include details for inbound or outbound processing of a message. The details can be defined in the communication channel template. In particular, the communication channel template defines an adapter type, a transport protocol, and a message protocol. In some implementations, various other parameters may be defined based on a selected adapter type. For example, the communication channel template can define a security level, conversion parameters, default exchange infrastructure parameters, processing parameters, download URI parameters, and specific message properties.

The communication channel template 224 can interact with internal or external process components (at 204 and 228). To interact with an internal process component, the communication channel template is received and uploaded to be used with an operation and interface pair. To interact with an external process component, the communication channel template is received and uploaded to be used with an external entity, such as an external bank, business partner, or supplier.

The architectural elements also include the deployment unit 226. A deployment unit 226 includes one or more process components 204 that are deployed together on a single computer system platform. Conversely, separate deployment units can be deployed on separate physical computing systems. For this reason, a boundary of a deployment unit 226 defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components 204 of one instance of one deployment unit 226.

The process components 204 of one deployment unit 226 interact with those of another deployment unit 226 using messages 218 passed through one or more data communication networks or other suitable communication channels. Thus, a deployment unit 226 deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units 226 is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components 204 that interact with other process components 204 or external systems only through messages 218, e.g., as sent and received by operations 206, can also be replaced as long as the replacement supports the operations 206 of the original 204.

In contrast to a deployment unit 226, the foundation layer does not define a limit for application-defined transactions. Deployment units 226 communicate directly with entities in the foundation layer, which communication is typically not message based. The foundation layer is active in every system instance on which the application is deployed. Business objects 202 in the foundation layer will generally be master data objects. In addition, the foundation layer will include some business process objects that are used by multiple deployment units 226. Master data objects and business process objects that should be specific to a deployment unit 226 are assigned to their respective deployment unit 226.

Interactions between Process Components "Time and Labor Management" and "Payroll Processing"

Figure 3:
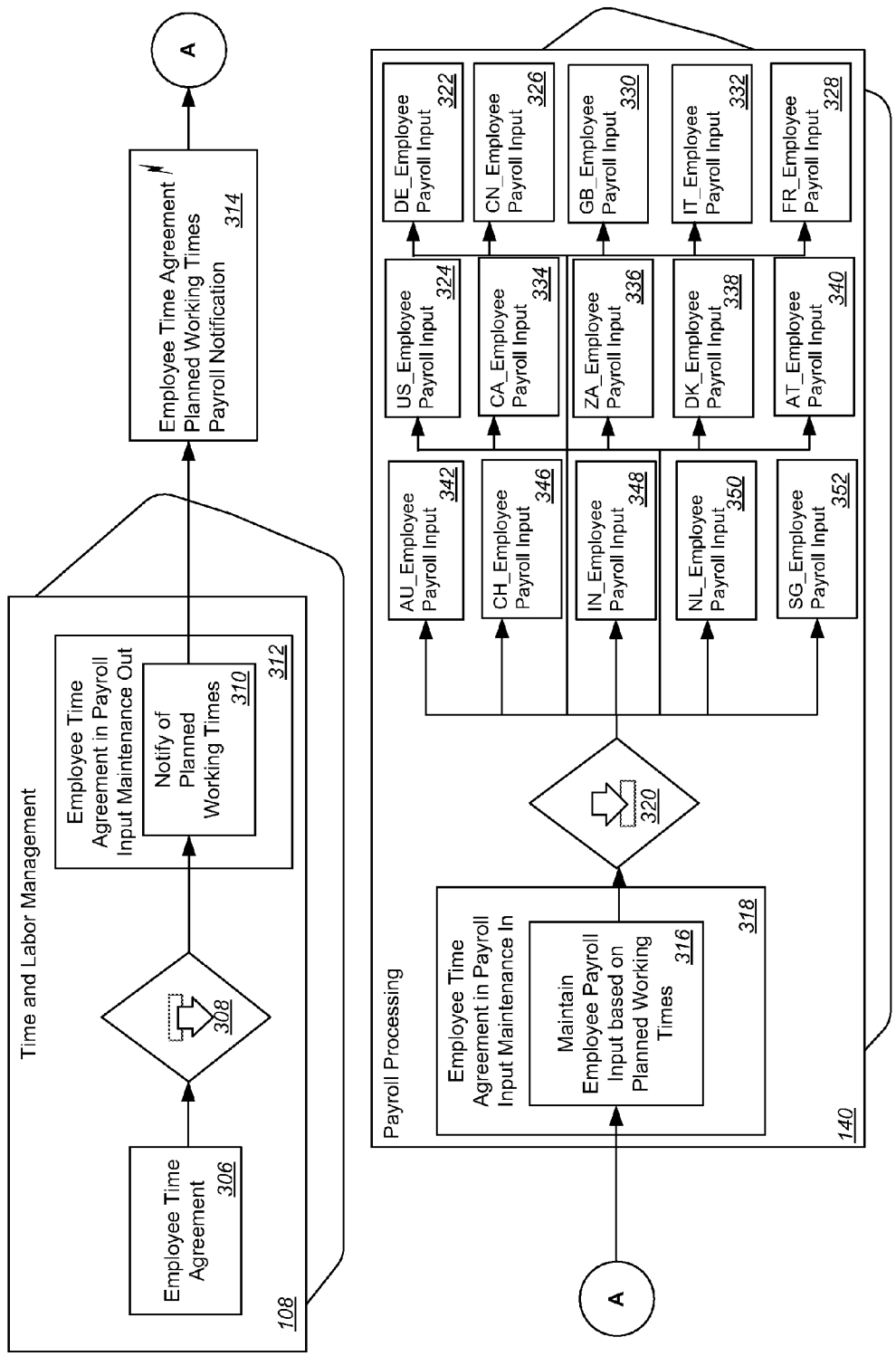
FIG. 3 is a block diagram showing interactions between a Time and Labor Management process component and a Payroll Processing process component.

FIG. 3 is a block diagram showing interactions between the Time and Labor Management process component 108 and the Payroll Processing process component 140 in the architectural design of FIG. 1.

As shown in FIG. 3, the Time and Labor Management process component 108 includes an Employee Time Agreement business object 306. The Employee Time Agreement business object 306 represents an agreement between employer and employee including time management stipulations derived from legal, company-specific, and pay-related provisions, and from terms agreed individually with the employee.

The Employee Time Agreement business object 306 uses a Notify of Planned Working Times from Time Agreement to Payroll Processing outbound process agent 308 to invoke a Notify of Planned Working Times operation 3 10. The operation 310 is included in an Employee Time Agreement in Payroll Input Maintenance Out interface 312. The operation 310 provides notification about planned working times. The operation 310 generates an Employee Time Agreement Planned Working Times Payroll Notification message 314.

A Maintain Employee Payroll Input based on Planned Working Times operation 316 receives the Employee Time Agreement Planned Working Times Payroll Notification message 314. The operation 316 is included in an Employee Time Agreement in Payroll Input Maintenance In interface 318. The operation 316 maintains country-specific Employee Payroll Input business objects based on the country in which an employee is employed, and based on changes to the Employee Time Agreement business object 306. The operation 316 uses a Maintain Employee Payroll Input based on Planned Working Times inbound process agent 320 to update a DE_Employee Payroll Input business object 322, a US_Employee Payroll Input business object 324, a CN_Employee Payroll Input business object 326, an FR_Employee Payroll Input business object 328, a GB_Employee Payroll Input business object 330, an IT_Employee Payroll Input business object 332, a CA_Employee Payroll Input business object 334, a ZA_Employee Payroll Input business object 336, a DK_Employee Payroll Input business object 338, an AT_Employee Payroll Input business object 340, an AU_Employee Payroll Input business object 342, a CH_Employee Payroll Input business object 346, an IN_Employee Payroll Input business object 348, an NL_Employee Payroll Input business object 350, or an SG_Employee Payroll Input business object 352.

The DE_Employee Payroll Input business object 322 represents a summary of employee-specific input for German payroll for one employee. The US_Employee Payroll Input business object 324 represents a summary of employee-specific input for US payroll for one employee. The CN_Employee Payroll Input business object 326 represents a summary of employee-specific input for Chinese payroll for one employee. The FR_Employee Payroll Input business object 328 represents a summary of employee-specific input for French payroll for one employee. The GB_Employee Payroll Input business object 330 represents a summary of employee-specific input for GB payroll for one employee. The IT_Employee Payroll Input business object 332 represents a summary of employee specific input for Italian payroll for one employee. The CA_Employee Payroll Input business object 334 represents a summary of employee specific input for Canadian payroll. The ZA_Employee Payroll Input business object 336 represents a summary of employee specific input for South African payroll. The DK_Employee Payroll Input business object 338 represents a summary of employee specific input for Danish payroll. The AT_Employee Payroll Input business object 340 represents a summary of employee specific input for Austrian payroll for one employee. The AU_Employee Payroll Input business object 342 represents a summary of employee specific input for Australian payroll. The CH_Employee Payroll Input business object 346 represents a summary of employee specific input for Swiss payroll for one employee. The IN_Employee Payroll Input business object 348 represents a summary of employee specific input for Indian payroll for one employee. The NL_Employee Payroll Input business object 350 represents a summary of employee specific input for Dutch payroll. The SG_Employee Payroll Input business object 352 represents a summary of employee specific input for Singaporean payroll.

Interactions between Process Components "AU Employer Regulatory Compliance" and "Payroll Processing"

Figure 4:
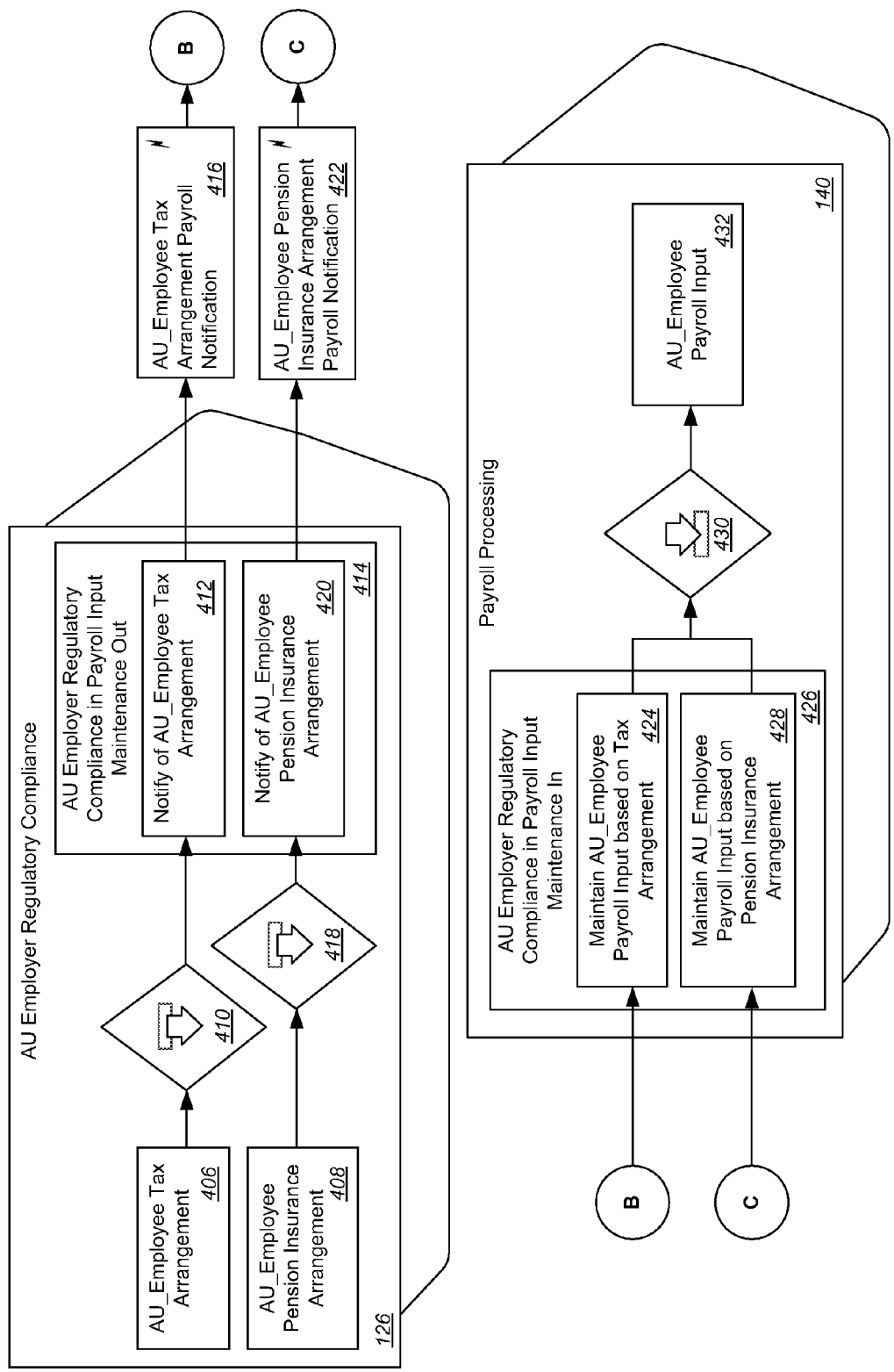
FIG. 4 is a block diagram showing interactions between an AU Employer Regulatory Compliance process component and the Payroll Processing process component.

FIG. 4 is a block diagram showing interactions between the AU Employer Regulatory Compliance process component 126 and the Payroll Processing process component 140 in the architectural design of FIG. 1.

As shown in FIG. 4, the AU Employer Regulatory Compliance process component 126 includes an AU_Employee Tax Arrangement business object 406 and an AU_Employee Pension Insurance Arrangement business object 408. The AU_Employee Tax Arrangement business object 406 represents an arrangement between the employee and the tax authorities of Australia that defines the rules of how the employer must calculate and report taxes for this employee to be compliant with the legal requirements of Australia. The AU_Employee Pension Insurance Arrangement business object 408 represents an arrangement for the employee by responsible Australian bodies that are legally responsible for administering the employee's social insurance contributions. This arrangement concerns the information required for calculation of Australia pension insurance contributions and reporting according to the Australian legal requirements.

The AU_Employee Tax Arrangement business object 406 uses a Notify of AU_Employee Tax Arrangement to Payroll Processing outbound process agent 410 to invoke a Notify of AU_Employee Tax Arrangement operation 412. The operation 412 is included in an AU Employer Regulatory Compliance in Payroll Input Maintenance Out interface 414. The operation 412 provides notification about new or changed tax data from an AU employee. The operation 412 generates an AU_Employee Tax Arrangement Payroll Notification message 416.

The AU_Employee Pension Insurance Arrangement business object 408 uses a Notify of AU_Employee Pension Insurance Arrangement to Payroll Process outbound process agent 418 to invoke a Notify of AU_Employee Pension Insurance Arrangement operation 420. The operation 420 is included in the AU_Employer Regulatory Compliance in Payroll Input Maintenance Out interface 414. The operation 420 provides notification about new or changed pension insurance data for an AU employee. The operation 420 generates an AU_Employee Pension Insurance Arrangement Payroll Notification message 422.

A Maintain AU_Employee Payroll Input based on Tax Arrangement operation 424 receives the AU-Employee Tax Arrangement Payroll Notification message 416. The operation 424 is included in an AU Employer Regulatory Compliance in Payroll Input Maintenance In interface 426. The operation 424 maintains information on an employee's AU tax arrangement.

A Maintain AU_Employee Payroll Input based on Pension Insurance Arrangement operation 428 receives the AU_Employee Pension Insurance Arrangement Payroll Notification message 422. The operation 428 is included in the AU Employer Regulatory Compliance in Payroll Input Maintenance In interface 426. The operation 428 maintains information on an employee's AU pension insurance arrangement.

The Maintain AU_Employee Payroll Input based on Tax Arrangement operation 424 and the Maintain AU_Employee Payroll Input based on Pension Insurance Arrangement operation 428 use a Maintain AU_Employee Payroll Input based on Employer Regulatory Compliance inbound process agent to update an AU_Employee Payroll Input business object 432. The AU_Employee Payroll Input business object 432 represents a summary of employee specific input for Australian payroll.

Interactions between Process Components "FR Employer Regulatory Compliance" and "Payroll Processing"

Figure 5:
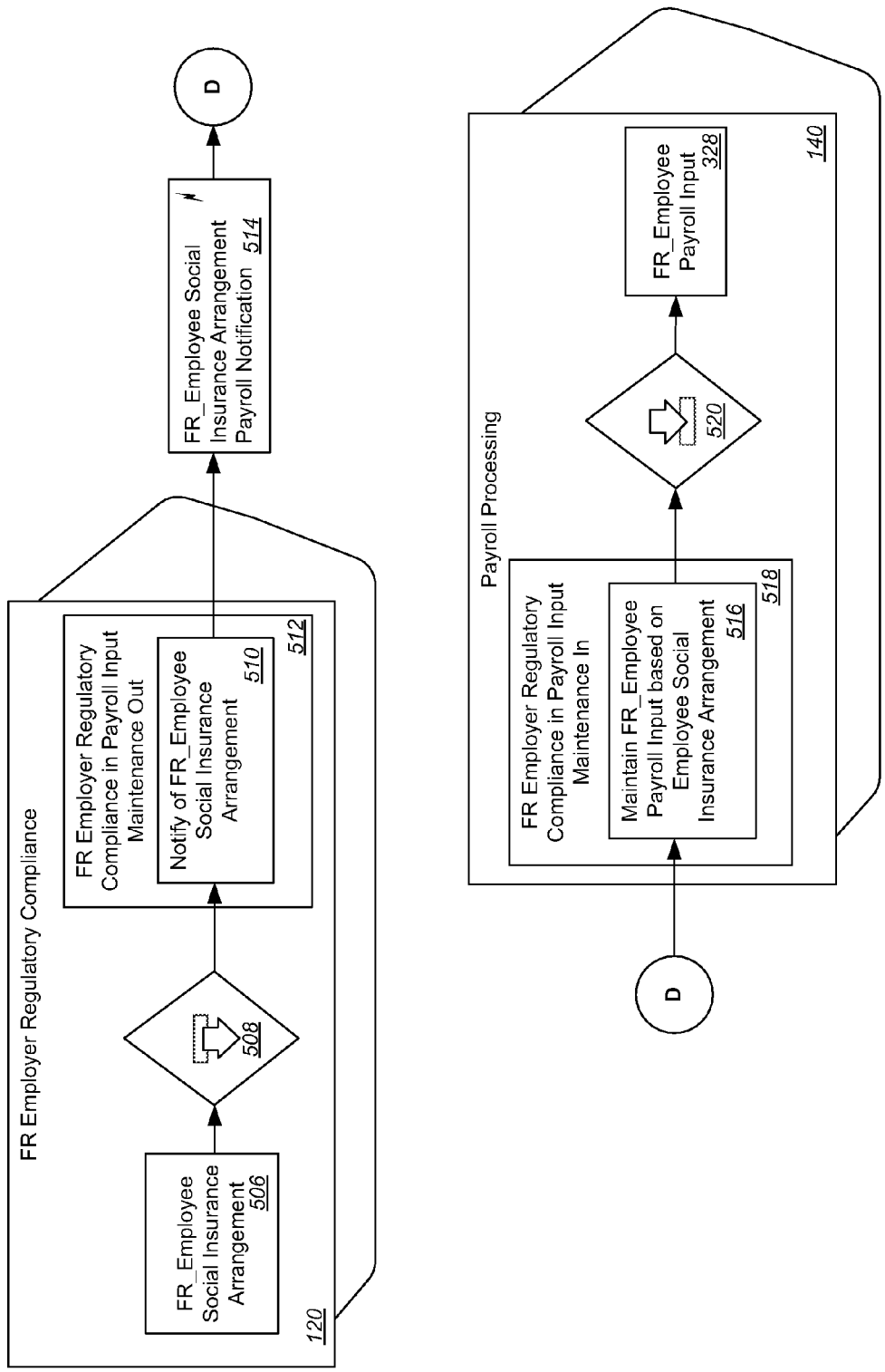
FIG. 5 is a block diagram showing interactions between an FR Employer Regulatory Compliance process component and the Payroll Processing process component.

FIG. 5 is a block diagram showing interactions between the FR Employer Regulatory Compliance process component 120 and the Payroll Processing process component 140 in the architectural design of FIG. 1.

As shown in FIG. 5, the FR Employer Regulatory Compliance process component 120 includes an FR_Employee Social Insurance Arrangement business object 506. The FR_Employee Social Insurance Arrangement business object 506 represents an arrangement for the employee by responsible French bodies that are legally responsible for administering the employee's social insurance contributions. This arrangement concerns the information required for calculation of French social insurance contributions and reporting according to the French legal requirements.

The FR_Employee Social Insurance Arrangement business object 506 uses a Notify of FR_Employee Social Insurance Arrangement to Payroll Processing outbound process agent 508 to invoke a Notify of FR_Employee Social Insurance Arrangement operation 5 10. The operation 510 is included in an FR Employer Regulatory Compliance in Payroll Input Maintenance Out interface 512. The operation 510 provides notification about new or changed social insurance data for an FR employee. The operation 510 generates an FR_Employee Social Insurance Arrangement Payroll Notification message 514.

A Maintain FR_Employee Payroll Input based on Employee Social Insurance Arrangement operation 516 receives the FR_Employee Social Insurance Arrangement Payroll Notification message 514. The operation 516 is included in an FR Employer Regulatory Compliance in Payroll Input Maintenance In interface 518. The operation 516 maintains information on an employee's FR social insurance arrangement. The operation 516 uses a Maintain FR_Employee Payroll Input based on Employer Regulatory Compliance inbound process agent 520 to update the FR_Employee Payroll Input business object 328. The FR_Employee Payroll Input business object 328 represents a summary of employee specific input for French payroll for one employee.

Interactions between Process Components "GB Employer Regulatory Compliance" and "Payroll Processing"

Figure 6:
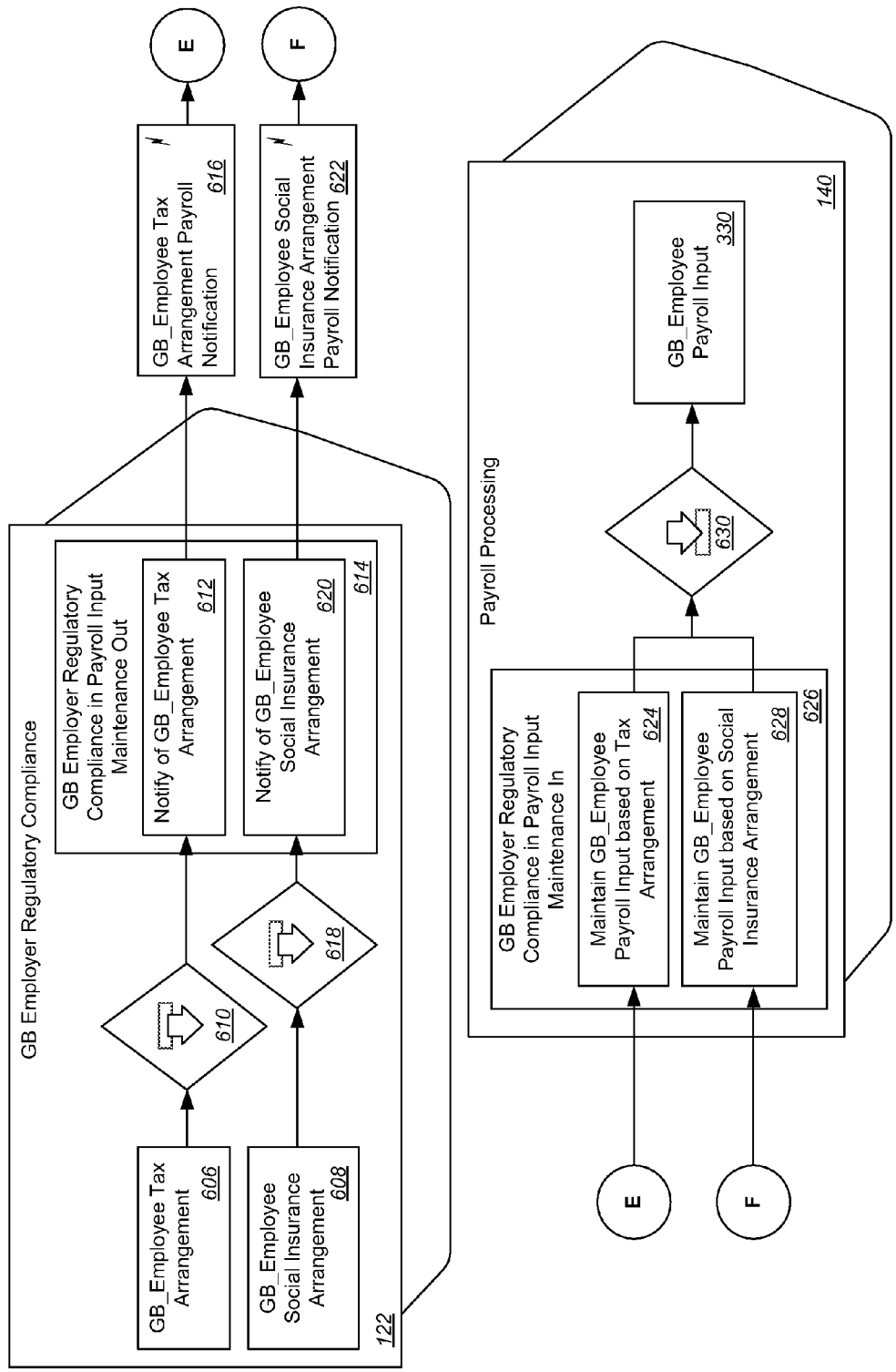
FIG. 6 is a block diagram showing interactions between a GB Employer Regulatory Compliance process component and the Payroll Processing process component.

FIG. 6 is a block diagram showing interactions between the GB Employer Regulatory Compliance process component 122 and the Payroll Processing process component 140 in the architectural design of FIG. 1.

As shown in FIG. 6, the GB Employer Regulatory Compliance process component 122 includes a GB_Employee Tax Arrangement business object 606 and a GB_Employee Social Insurance Arrangement business object 608. The GB_Employee Tax Arrangement business object 606 represents an arrangement by the United Kingdom tax authority for the employee concerning calculation and reporting of income tax deductions according to United Kingdom legal requirements. The GB_Employee Social Insurance Arrangement business object 608 represents an arrangement for the employee by United Kingdom social insurance authority concerning calculation and reporting of contributions according to the United Kingdom legal requirements.

The GB_Employee Tax Arrangement business object 606 uses a Notify of GB_Employee Tax Arrangement to Payroll Processing outbound process agent 610 to invoke a Notify of GB_Employee Tax Arrangement operation 612. The operation 612 is included in a GB Employer Regulatory Compliance in Payroll Input Maintenance Out interface 614. The operation 612 provides notification about new or changed tax data for a GB employee. The operation 612 generates a GB_Employee Tax Arrangement Payroll Notification message 616.

The GB_Employee Social Insurance Arrangement business object 608 uses a Notify of GB_Employee Social Insurance Arrangement to Payroll Processing outbound process agent 618 to invoke a Notify of GB_Employee Social Insurance Arrangement operation 620. The operation 620 is included in the GB Employer Regulatory Compliance in Payroll Input Maintenance Out interface 614. The operation 620 provides notification about new or changed social insurance data for a GB employee. The operation 620 generates a GB_Employee Social Insurance Arrangement Payroll Notification message 622.

A Maintain GB_Employee Payroll Input based on Tax Arrangement operation 624 receives the GB_Employee Tax Arrangement Payroll Notification message 616. The operation 624 is included in a GB Employer Regulatory Compliance in Payroll Input Maintenance In interface 626. The operation 624 maintains information on an employee's GB tax arrangement.

A Maintain GB_Employee Payroll Input based on Social Insurance Arrangement operation 628 receives the GB_Employee Social Insurance Arrangement Payroll Notification message 622. The operation 628 is included in the GB Employer Regulatory Compliance in Payroll Input Maintenance In interface 626. The operation 628 maintains information on an employee's GB social insurance arrangement.

The Maintain GB_Employee Payroll Input based on Tax Arrangement operation 624 and the Maintain GB_Employee Payroll Input based on Social Insurance Arrangement operation 628 use a Maintain GB_Employee Payroll Input based on Employer Regulatory Compliance inbound process agent 630 to update the GB_Employee Payroll Input business object 330. The GB_Employee Payroll Input business object 330 represents summary of employee specific input for GB payroll for one employee.

Interactions between Process Components "Employee Payroll Administration" and "Payroll Processing"

Figure 7:
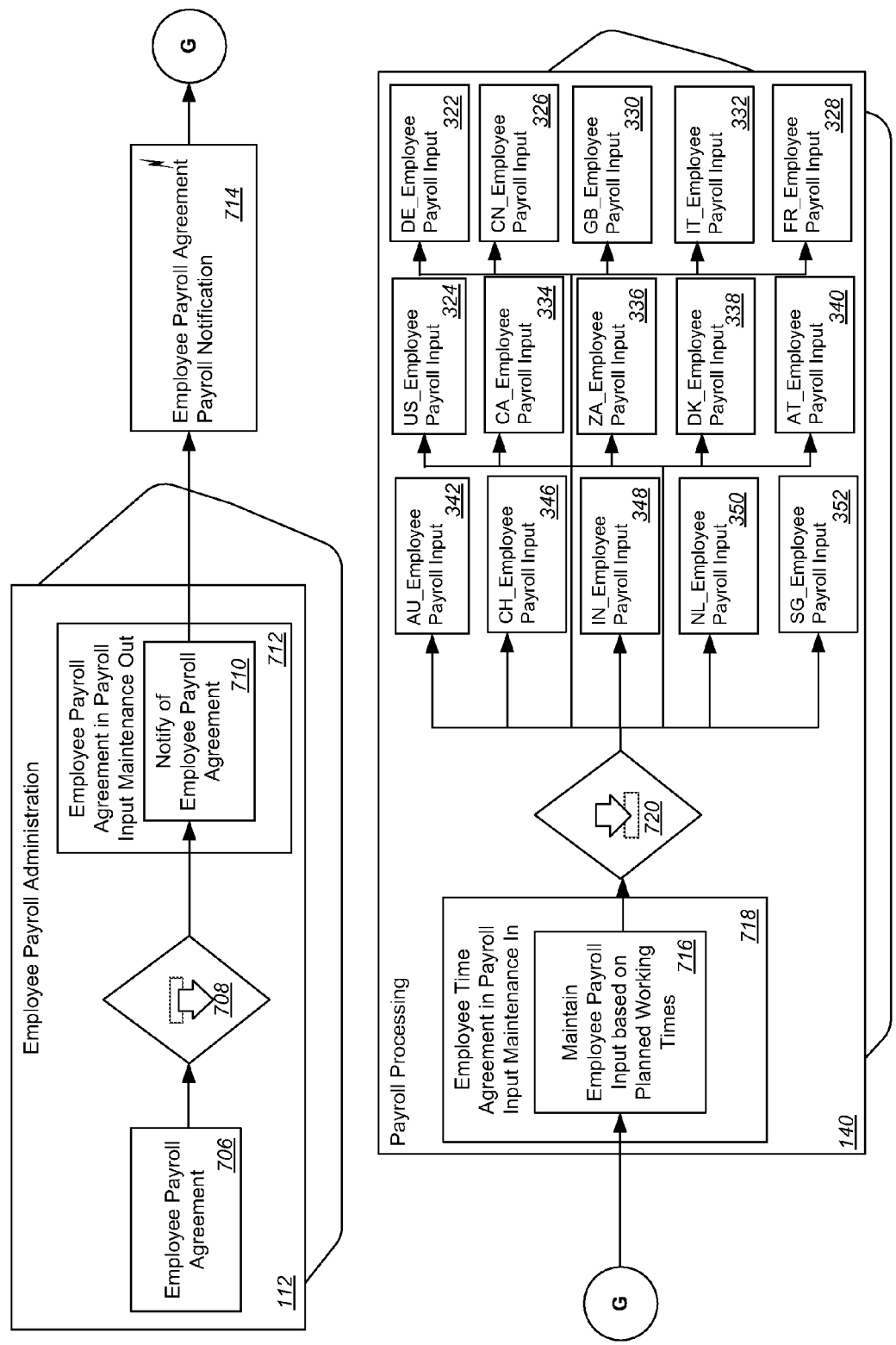
FIG. 7 is a block diagram showing interactions between an Employee Payroll Administration process component and the Payroll Processing process component.

FIG. 7 is a block diagram showing interactions between the Employee Payroll Administration process component 112 and the Payroll Processing process component 140 in the architectural design of FIG. 1.

As shown in FIG. 7, the Employee Payroll Administration process component 112 includes an Employee Payroll Agreement business object 706. The Employee Payroll Agreement business object 706 represents an agreement between the employer and employee concerning the personal conditions for payroll processing. This agreement determines the fundamental differentials of the payroll behavior for the employee.

The Employee Payroll Agreement business object 706 uses a Notify of Employee Payroll Agreement to Payroll Processing outbound process agent 708 to invoke a Notify of Employee Payroll Agreement operation 710. The operation 710 is included in an Employee Payroll Agreement in Payroll Input Maintenance Out interface 712. The operation 710 provides notification about changes to the employee payroll agreement. The operation 710 generates an Employee Payroll Agreement Payroll Notification message 714.

A Maintain Employee Payroll Input based on Employee Payroll Agreement operation 716 receives the Employee Payroll Agreement Payroll Notification message 714. The operation 716 is included in an Employee Payroll Agreement in Payroll Input Maintenance In interface 718. The operation 716 maintains country-specific Employee Payroll Input business objects based on the country in which an employee is employed, and based on changes to the Employee Payroll Agreement business object 706. The operation 716 uses a Maintain Employee Payroll Input based on Employee Payroll Agreement inbound process agent 720 to update a DE_Employee Payroll Input business object 322, a US_Employee Payroll Input business object 324, a CN_Employee Payroll Input business object 326, an FR_Employee Payroll Input business object 328, a GB_Employee Payroll Input business object 330, an IT_Employee Payroll Input business object 332, a CA_Employee Payroll Input business object 334, a ZA_Employee Payroll Input business object 336, a DK_Employee Payroll Input business object 338, an AT_Employee Payroll Input business object 340, an AU_Employee Payroll Input business object 342, a CH_Employee Payroll Input business object 346, an IN_Employee Payroll Input business object 348, an NL_Employee Payroll Input business object 350, or an SG_Employee Payroll Input business object 352.

The DE_Employee Payroll Input business object 322 represents a summary of employee-specific input for German payroll for one employee. The US_Employee Payroll Input business object 324 represents a summary of employee-specific input for US payroll for one employee. The CN_Employee Payroll Input business object 326 represents a summary of employee-specific input for Chinese payroll for one employee. The FR_Employee Payroll Input business object 328 represents a summary of employee-specific input for French payroll for one employee. The GB_Employee Payroll Input business object 330 represents a summary of employee-specific input for GB payroll for one employee. The IT_Employee Payroll Input business object 332 represents a summary of employee-specific input for Italian payroll for one employee. The CA_Employee Payroll Input business object 334 represents a summary of employee specific input for Canadian payroll. The ZA_Employee Payroll Input business object 336 represents a summary of employee specific input for South African payroll. The DK_Employee Payroll Input business object 338 represents a summary of employee specific input for Danish payroll. The AT_Employee Payroll Input business object 340 represents a summary of employee specific input for Austrian payroll for one employee. The AU_Employee Payroll Input business object 342 represents a summary of employee specific input for Australian payroll. The CH_Employee Payroll Input business object 346 represents a summary of employee specific input for Swiss payroll for one employee. The IN_Employee Payroll Input business object 348 represents a summary of employee specific input for Indian payroll for one employee. The NL_Employee Payroll Input business object 350 represents a summary of employee specific input for Dutch payroll. The SG_Employee Payroll Input business object 352 represents a summary of employee specific input for Singaporean payroll.

Interactions between Process Components "DK Employer Regulatory Compliance" and "Payroll Processing"

Figure 8:
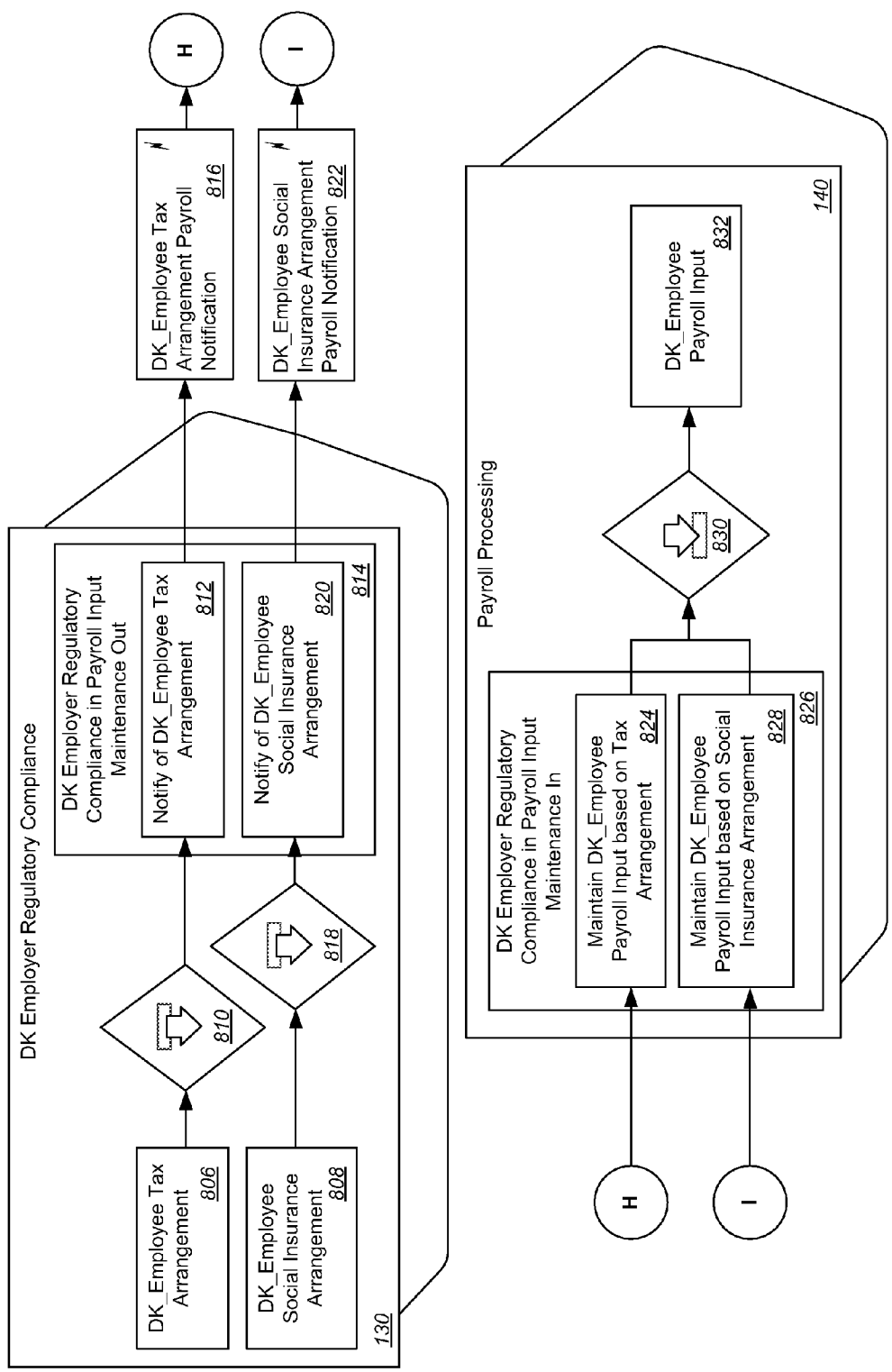
FIG. 8 is a block diagram showing interactions between a DK Employer Regulatory Compliance process component and the Payroll Processing process component.

FIG. 8 is a block diagram showing interactions between the DK Employer Regulatory Compliance process component 130 and the Payroll Processing process component 140 in the architectural design of FIG. 1.

As shown in FIG. 8, the DK Employer Regulatory Compliance process component 130 includes a DK_Employee Tax Arrangement business object 806 and a DK_Employee Social Insurance Arrangement business object 808. The DK_Employee Tax Arrangement business object 806 represents an arrangement between the employee and the tax authorities of Denmark that defines the rules of how the employer must calculate and report taxes for this employee to be compliant with the legal requirements of Denmark. The DK_Employee Social Insurance Arrangement business object 808 represents an arrangement for the employee by responsible Danish bodies that are legally responsible for administering the employee's social insurance contributions. This arrangement concerns the information required for calculation of Danish social insurance contributions and reporting according to the Danish legal requirements.

The DK_Employee Tax Arrangement business object 806 uses a Notify of DK_Employee Tax Arrangement to Payroll Processing outbound process agent 810 to invoke a Maintain DK_Employee Payroll Input based on Tax Arrangement operation 812. The operation 812 is included in a DK Employer Regulatory Compliance in Payroll Input Maintenance Out interface 814. The operation 812 provides notification about new or changed tax data for a DK employee. The operation 812 generates a DK_Employee Tax Arrangement Payroll Notification message 816.

The DK_Employee Social Insurance Arrangement business object 808 uses a Notify of DK_Employee Social Insurance Arrangement to Payroll Processing outbound process agent 818 to invoke a Notify of DK_Employee Social Insurance Arrangement operation 820. The operation 820 is included in the DK Employer Regulatory Compliance in Payroll Input Maintenance Out interface 814. The operation provides notification about new or changed social insurance data for a DK employee. The operation 820 generates a DK_Employee Social Insurance Arrangement Payroll Notification message 822.

A Maintain DK_Employee Payroll Input based on Tax Arrangement operation 824 receives the DK_Employee Tax Arrangement Payroll Notification message 816. The operation 824 is included in a DK Employer Regulatory Compliance in Payroll Input Maintenance In interface 826. The operation 824 maintains information on an employee's DK tax arrangement.

A Maintain DK_Employee Payroll Input based on Social Insurance Arrangement operation 828 receives the DK_Employee Social Insurance Arrangement Payroll Notification message 822. The operation 828 is included in the DK Employer Regulatory Compliance in Payroll Input Maintenance In interface 826. The operation 828 maintains information on an employee's DK social insurance arrangement.

The Maintain DK_Employee Payroll Input based on Tax Arrangement operation 824 and the Maintain DK_Employee Payroll Input based on Social Insurance Arrangement operation 828 use a Maintain DK_Employee Payroll Input based on Employer Regulatory Compliance inbound process agent 830 to update a DK_Employee Payroll Input business object 832. The DK_Employee Payroll Input business object 832 represents a summary of employee specific input for Danish payroll.

Interactions between Process Components "CN Employer Regulatory Compliance" and "Payroll Processing"

Figure 9:
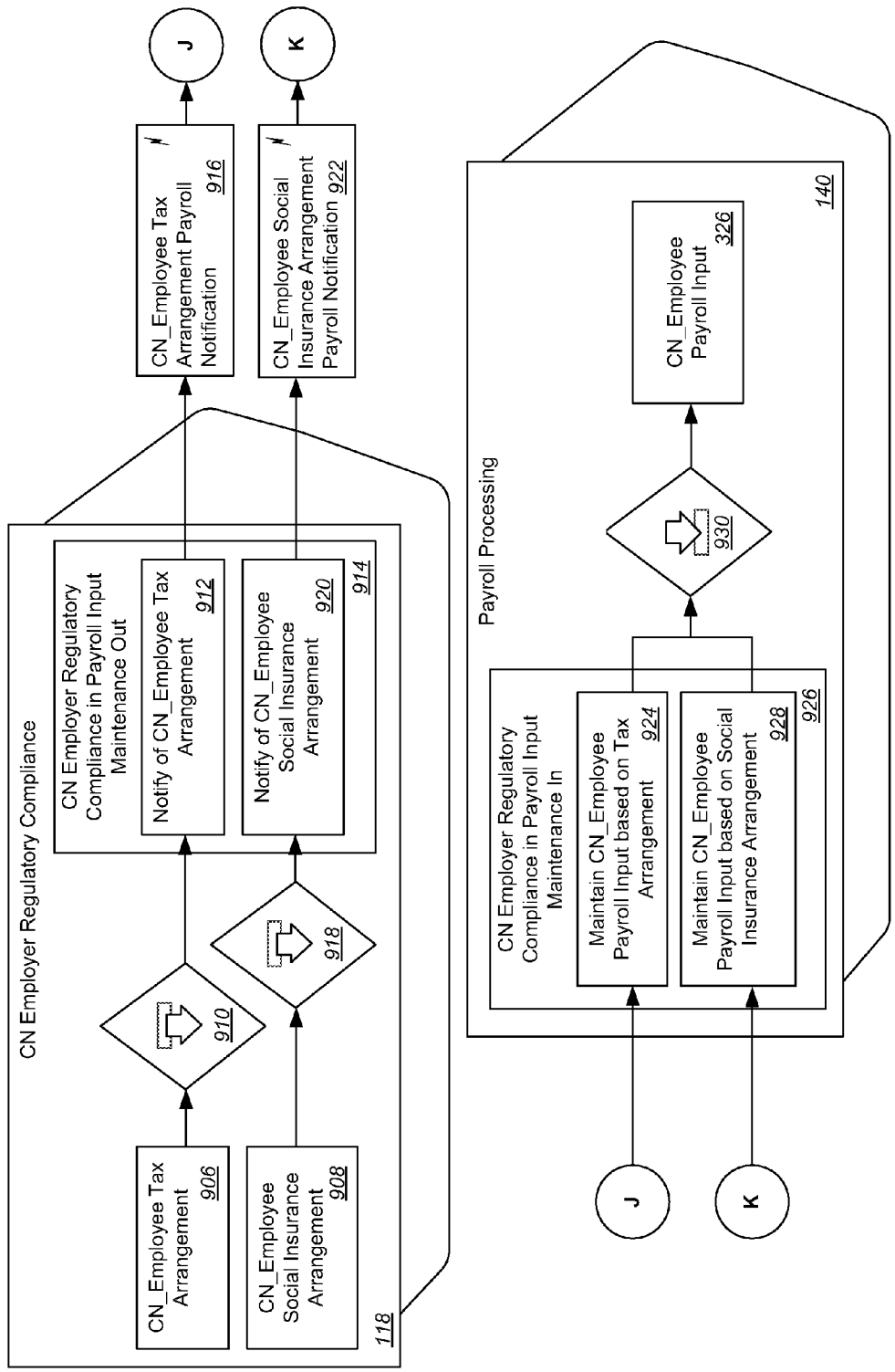
FIG. 9 is a block diagram showing interactions between a CN Employer Regulatory Compliance process component and the Payroll Processing process component.

FIG. 9 is a block diagram showing interactions between the CN Employer Regulatory Compliance process component 118 and the Payroll Processing process component 140 in the architectural design of FIG. 1.

As shown in FIG. 9, the CN Employer Regulatory Compliance process component 118 includes a CN_Employee Tax Arrangement business object 906 and a CN_Employee Social Insurance Arrangement business object 908. The CN_Employee Tax Arrangement business object 906 represents an arrangement between the employee and the tax authorities of the People's Republic of China that defines the rules of how the employer must calculate and report taxes for this employee to be compliant with the legal requirements. The CN_Employee Social Insurance Arrangement business object 908 represents an arrangement for the employee by the People's Republic of China bodies that are legally responsible for administering the employee's social insurance contributions and benefits. This arrangement concerns the information required for calculation of the People's Republic of China social insurance contributions and reporting according to the People's Republic of China Social Insurance Bodies.

The CN_Employee Tax Arrangement business object 906 uses a Notify of CN_Employee Tax Arrangement to Payroll Processing outbound process agent 910 to invoke a Maintain CN_Employee Payroll Input based on Tax Arrangement operation 912. The operation 912 is included in a CN Employer Regulatory Compliance in Payroll Input Maintenance Out interface 914. The operation 912 provides notification about new or changed tax data for a CN employee. The operation 912 generates a CN_Employee Tax Arrangement Payroll Notification message 916.

The CN_Employee Social Insurance Arrangement business object 908 uses a Notify of CN_Employee Social Insurance Arrangement to Payroll Processing outbound process agent 918 to invoke a Notify of CN_Employee Social Insurance Arrangement operation 920. The operation 920 is included in the CN Employer Regulatory Compliance in Payroll Input Maintenance Out interface 914. The operation provides notification about new or changed social insurance data for a CN employee. The operation 920 generates a CN_Employee Social Insurance Arrangement Payroll Notification message 922.

A Maintain CN_Employee Payroll Input based on Tax Arrangement operation 924 receives the CN_Employee Tax Arrangement Payroll Notification message 916. The operation 924 is included in a CN Employer Regulatory Compliance in Payroll Input Maintenance In interface 926. The operation 924 maintains information on an employee's CN tax arrangement.

A Maintain CN_Employee Payroll Input based on Social Insurance Arrangement operation 928 receives the CN_Employee Social Insurance Arrangement Payroll Notification message 922. The operation 928 is included in the CN Employer Regulatory Compliance in Payroll Input Maintenance In interface 926. The operation 928 maintains information on an employee's CN social insurance arrangement.

The Maintain CN_Employee Payroll Input based on Tax Arrangement operation 924 and the Maintain CN_Employee Payroll Input based on Social Insurance Arrangement operation 928 use a Maintain CN_Employee Payroll Input based on Employer Regulatory Compliance inbound process agent 930 to update the CN_Employee Payroll Input business object 326. The CN_Employee Payroll Input business object 326 represents a summary of employee specific input for Chinese payroll for one employee.

Interactions between Process Components "SG Employer Regulatory Compliance" and "Payroll Processing"

Figure 10:
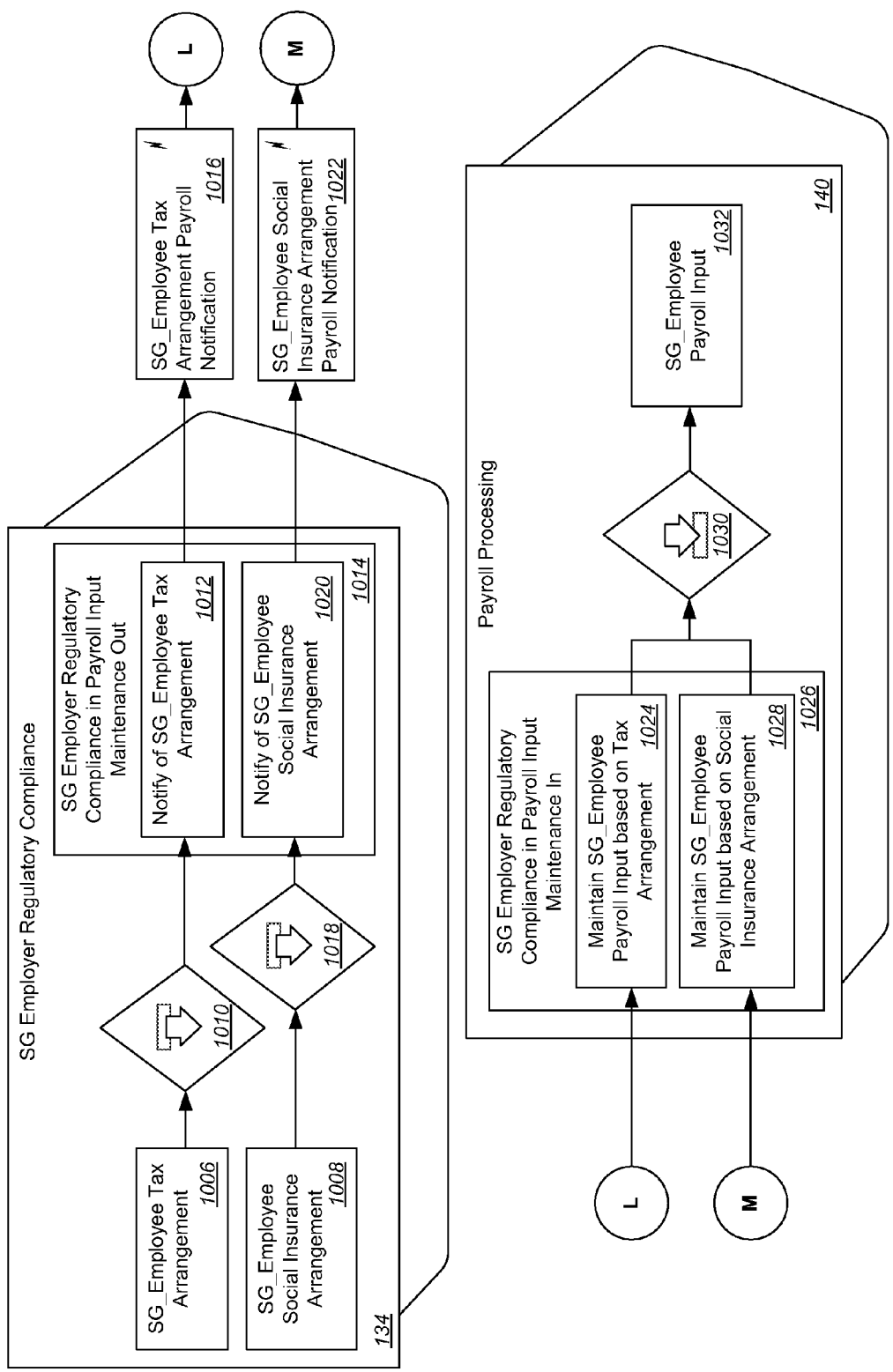
FIG. 10 is a block diagram showing interactions between an SG Employer Regulatory Compliance process component and the Payroll Processing process component.

FIG. 10 is a block diagram showing interactions between the SG Employer Regulatory Compliance process component 134 and the Payroll Processing process component 140 in the architectural design of FIG. 1.

As shown in FIG. 10, the SG Employer Regulatory Compliance process component 134 includes an SG_Employee Tax Arrangement business object 1006 and an SG_Employee Social Insurance Arrangement business object 1008. The SG_Employee Tax Arrangement business object 1006 represents an arrangement between the employee and the tax authorities of Singapore that defines the rules of how the employer must calculate and report taxes for this employee to be compliant with the legal requirements of Singapore. The SG_Employee Social Insurance Arrangement business object 1008 represents an arrangement for the employee by responsible Singaporean bodies that are legally responsible for administering the employee's social insurance contributions. This arrangement concerns the information required for calculation of Singaporean social insurance contributions and reporting according to the Singapore legal requirements.

The SG_Employee Tax Arrangement business object 1006 uses a Notify of SG_Employee Tax Arrangement to Payroll Processing outbound process agent 1010 to invoke a Notify of SG_Employee Tax Arrangement operation 1012. The operation 1012 is included in an SG Employer Regulatory Compliance in Payroll Input Maintenance Out interface 1014. The operation 1012 provides notification about new or changed tax data for an SG employee. The operation 1012 generates an SG_Employee Tax Arrangement Payroll Notification message 1016.

The SG_Employee Social Insurance Arrangement business object 1008 uses a Notify of SG_Employee Social Insurance Arrangement to Payroll Processing outbound process agent 1018 to invoke a Notify of SG_Employee Social Insurance Arrangement operation 1020. The operation 1020 is included in the SG Employer Regulatory Compliance in Payroll Input Maintenance Out interface 1014. The operation 1020 provides notification about new or changed social insurance data for an SG employee. The operation 1020 generates an SG_Employee Social Insurance Arrangement Payroll Notification message 1022.

A Maintain SG_Employee Payroll Input based on Tax Arrangement operation 1024 receives the SG_Employee Tax Arrangement Payroll Notification message 1016. The operation 1024 is included in an SG Employer Regulatory Compliance in Payroll Input Maintenance In interface 1026. The operation maintains information on an employee's SG tax arrangement.

A Maintain SG_Employee Payroll Input based on Social Insurance Arrangement operation 1028 receives the SG_Employee Social Insurance Arrangement Payroll Notification message 1022. The operation 1028 is included in the SG Employer Regulatory Compliance in Payroll Input Maintenance In interface 1026. The operation 1028 maintains information on an employee's SG social insurance arrangement.

The Maintain SG_Employee Payroll Input based on Tax Arrangement operation 1024 and the Maintain SG_Employee Payroll Input based on Social Insurance Arrangement operation 1028 use a Maintain SG_Employee Payroll Input based on Employer Regulatory Compliance inbound process agent 1030 to update an SG_Employee Payroll Input business object 1032. The SG_Employee Payroll Input business object 1032 represents a summary of employee specific input for Singaporean payroll.

Interactions between Process Components "ZA Employer Regulatory Compliance" and "Payroll Processing"

Figure 11:
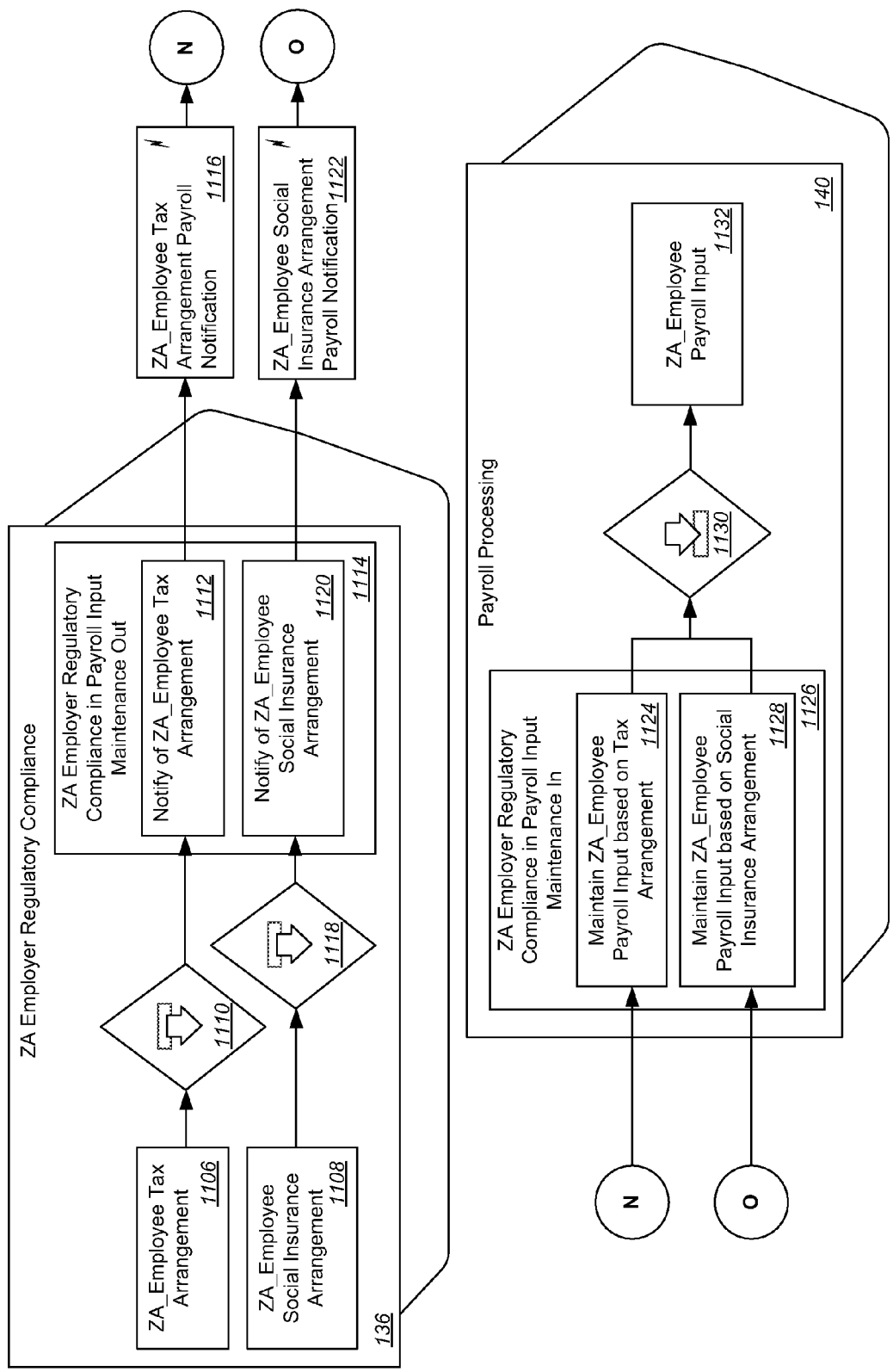
FIG. 11 is a block diagram showing interactions between a ZA Employer Regulatory Compliance process component and the Payroll Processing process component.

FIG. 11 is a block diagram showing interactions between the ZA Employer Regulatory Compliance process component 136 and the Payroll Processing process component 140 in the architectural design of FIG. 1.

As shown in FIG. 11, the ZA Employer Regulatory Compliance process component 136 includes a ZA_Employee Tax Arrangement business object 1106 and a ZA_Employee Social Insurance Arrangement business object 1108. The ZA_Employee Tax Arrangement business object 1106 represents an arrangement between the employee and the tax authorities of South Africa that defines the rules of how the employer must calculate and report taxes for this employee to be compliant with the legal requirements of South Africa. The ZA_Employee Social Insurance Arrangement business object 1108 represents an arrangement for the employee by responsible South African bodies that are legally responsible for administering the employee's social insurance contributions. This arrangement concerns the information required for calculation of South African social insurance contributions and reporting according to the South African legal requirements.

The ZA_Employee Tax Arrangement business object 1106 uses a Notify of ZA_Employee Tax Arrangement to Payroll Processing outbound process agent 1110 to invoke a Notify of ZA_Employee Tax Arrangement operation 1112. The operation 1112 is included in a ZA Employer Regulatory Compliance in Payroll Input Maintenance Out interface 1114. The operation 1112 provides notification about new or changed tax data for a ZA employee. The operation 1112 generates a ZA_Employee Tax Arrangement Payroll Notification message 1116.

The ZA_Employee Social Insurance Arrangement business object 1108 uses a Notify of ZA_Employee Social Insurance Arrangement to Payroll Processing outbound process agent 1118 to invoke a Notify of ZA_Employee Social Insurance Arrangement operation 1120. The operation 1120 is included in the ZA Employer Regulatory Compliance in Payroll Input Maintenance Out interface 1114. The operation 1120 provides notification about new or changed social insurance data for a ZA employee. The operation 1120 generates a ZA_Employee Social Insurance Arrangement Payroll Notification message 1122.

A Maintain ZA_Employee Payroll Input based on Tax Arrangement operation 1124 receives the ZA_Employee Tax Arrangement Payroll Notification message 1116. The operation 1124 is included in a ZA Employer Regulatory Compliance in Payroll Input Maintenance In interface 1126. The operation 1124 maintains information on an employee's ZA tax arrangement.

A Maintain ZA_Employee Payroll Input based on Social Insurance Arrangement operation 1128 receives the ZA_Employee Social Insurance Arrangement Payroll Notification message 1122. The operation 1128 is included in the ZA Employer Regulatory Compliance in Payroll Input Maintenance In interface 1126. The operation 1128 maintains information on an employee's ZA social insurance arrangement.

The Maintain ZA_Employee Payroll Input based on Tax Arrangement operation 1124 and the Maintain ZA_Employee Payroll Input based on Social Insurance Arrangement operation 1128 use a Maintain ZA_Employee Payroll Input based on Employer Regulatory Compliance inbound process agent 1130 to update a ZA_Employee Payroll Input business object 1132. The ZA_Employee Payroll Input business object 1132 represents a summary of employee specific input for South African payroll.

Interactions between Process Components "CA Employer Regulatory Compliance" and "Payroll Processing"

Figure 12:
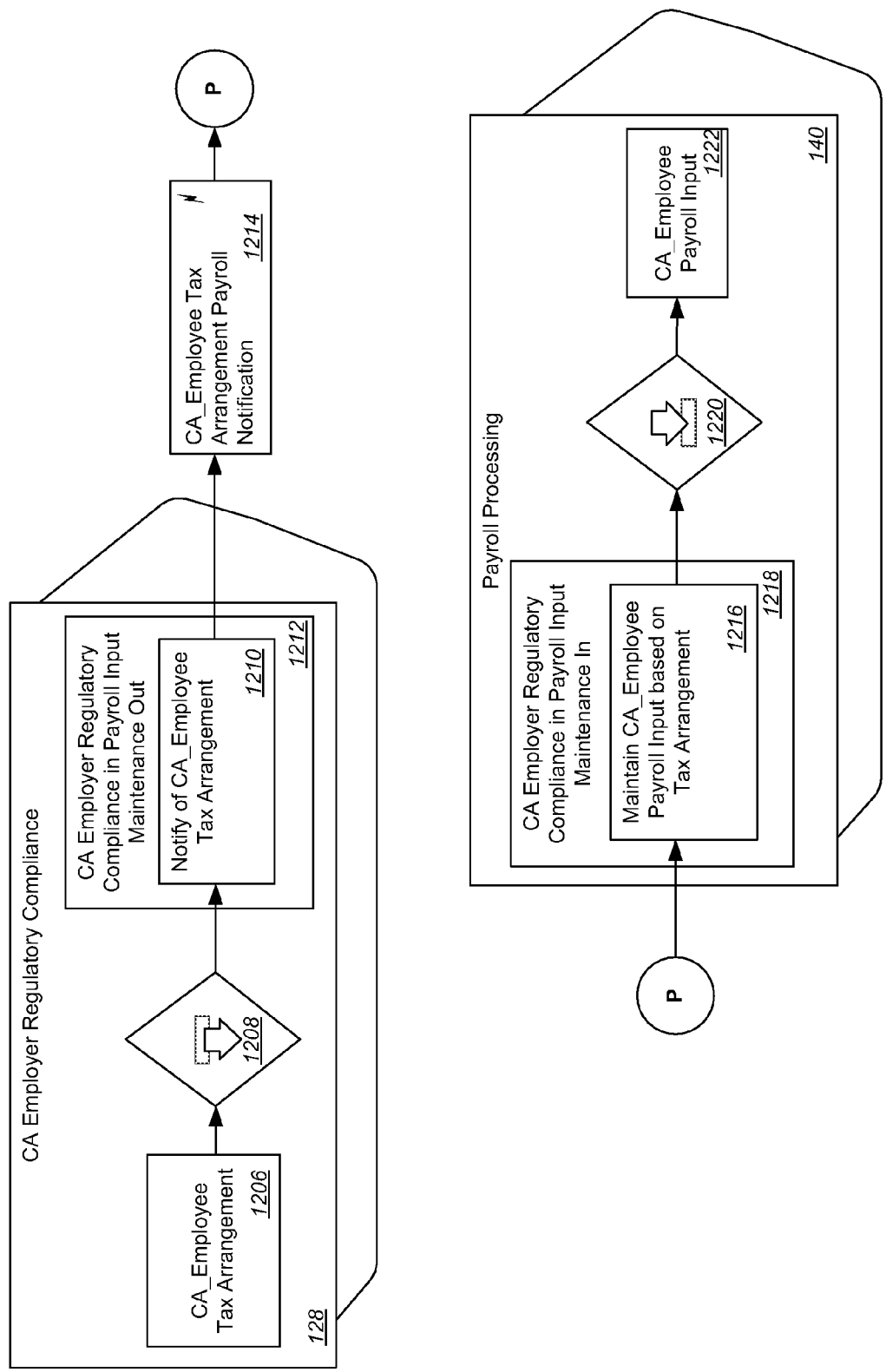
FIG. 12 is a block diagram showing interactions between a CA Employer Regulatory Compliance process component and the Payroll Processing process component.

FIG. 12 is a block diagram showing interactions between the CA Employer Regulatory Compliance process component 128 and the Payroll Processing process component 140 in the architectural design of FIG. 1

As shown in FIG. 12, the CA Employer Regulatory Compliance process component 128 includes a CA_Employee Tax Arrangement business object 1206. The CA_Employee Tax Arrangement business object 1206 represents an arrangement between the employee and the tax authorities of Canada that defines the rules of how the employer must calculate and report taxes for this employee to be compliant with the legal requirements of Canada.

The CA_Employee Tax Arrangement business object 1206 uses a Notify of CA_Employee Tax Arrangement to Payroll Processing outbound process agent 1208 to invoke a Notify of CA_Employee Tax Arrangement operation 1210. The operation 1210 is included in a CA Employer Regulatory Compliance in Payroll Input Maintenance Out interface 1212. The operation 1210 provides notification about new or changed tax data for a CA employee. The operation 1210 generates a CA_Employee Tax Arrangement Payroll Notification message 1214.

A Maintain CA_Employee Payroll Input based on Tax Arrangement operation 1216 receives the CA_Employee Tax Arrangement Payroll Notification message 1214. The operation 1216 is included in a CA Employer Regulatory Compliance in Payroll Input Maintenance In interface 1218. The operation 1216 maintains information on an employee's CA tax arrangement. The operation 1216 uses a Maintain CA_Employee Payroll Input based on Employer Regulatory Compliance inbound process agent 1220 to update a CA_Employee Payroll Input business object 1222. The CA_Employee Payroll Input business object 1222 represents a summary of employee specific input for Canadian payroll.

Interactions between Process Components "DE Employer Regulatory Compliance" and "Payroll Processing"

Figure 13:
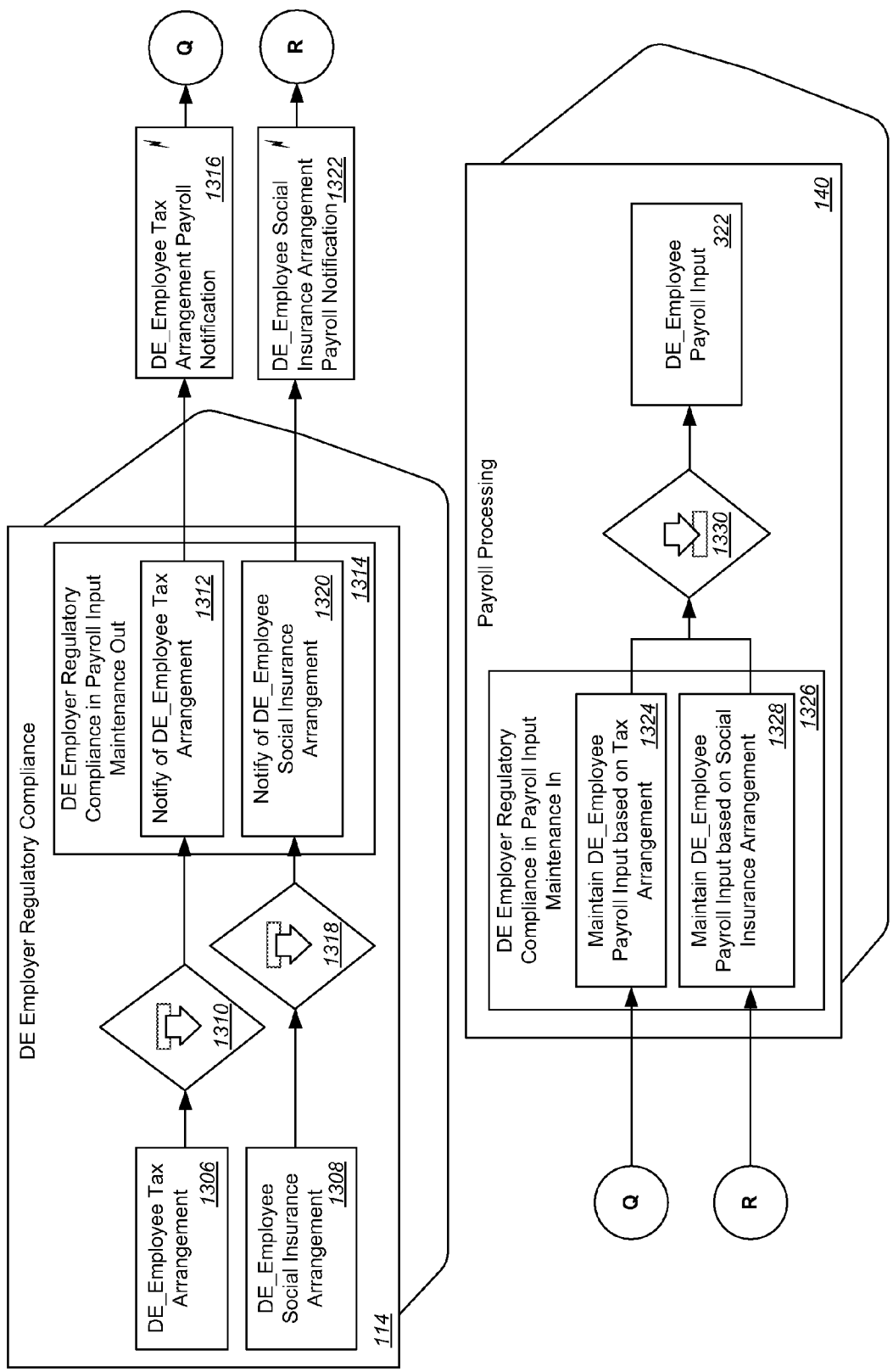
FIG. 13 is a block diagram showing interactions between a DE Employer Regulatory Compliance process component and the Payroll Processing process component.

FIG. 13 is a block diagram showing interactions between the DE Employer Regulatory Compliance process component 114 and the Payroll Processing process component 140 in the architectural design of FIG. 1.

As shown in FIG. 13, the DE Employer Regulatory Compliance process component 114 includes a DE_Employee Tax Arrangement business object 1306 and a DE_Employee Social Insurance Arrangement business object 1308. The DE_Employee Tax Arrangement business object 1306 represents an arrangement by the German tax authority for the employee, concerning calculation and reporting of income tax deductions according to German legal requirements. The DE_Employee Social Insurance Arrangement business object 1308 represents an arrangement for the employee by the German bodies that are legally responsible for administering the employee's social insurance contributions and benefits. This arrangement concerns the information required for calculation of German social insurance contributions and reporting according to the German Data Entry and Transfer Regulation.

The DE_Employee Tax Arrangement business object 1306 uses a Notify of DE_Employee Tax Arrangement to Payroll Processing outbound process agent 1310 to invoke a Notify of DE_Employee Tax Arrangement operation 1312. The operation 1312 is included in a DE Employer Regulatory Compliance in Payroll Input Maintenance Out interface 1314. The operation 1312 provides notification about new or changed tax data for a German employee. The operation 1312 generates a DE_Employee Tax Arrangement Payroll Notification message 1316.

The DE_Employee Social Insurance Arrangement business object 1308 uses a Notify of DE_Employee Social Insurance Arrangement to Payroll Processing outbound process agent 1318 to invoke a Notify of DE_Employee Social Insurance Arrangement operation 1320. The operation 1320 is included in the DE Employer Regulatory Compliance in Payroll Input Maintenance Out interface 1314. The operation 1320 provides notification about new or changed social insurance data for a German employee. The operation 1320 generates a DE_Employee Social Insurance Arrangement Payroll Notification message 1322.

A Maintain DE_Employee Payroll Input based on Tax Arrangement operation 1324 receives the DE_Employee Tax Arrangement Payroll Notification message 1316. The operation 1324 is included in a DE Employer Regulatory Compliance in Payroll Input Maintenance In interface 1326. The operation 1324 maintains information on an employee's DE tax arrangement.

A Maintain DE_Employee Payroll Input based on Social Insurance Arrangement operation 1328 receives the DE_Employee Social Insurance Arrangement Payroll Notification message 1322. The operation 1328 is included in the DE Employer Regulatory Compliance in Payroll Input Maintenance In interface 1326. The operation 1328 maintains information on an employee's DE social insurance arrangement.

The Maintain DE_Employee Payroll Input based on Tax Arrangement operation 1324 and the Maintain DE_Employee Payroll Input based on Social Insurance Arrangement operation 1328 use a Maintain DE_Employee Payroll Input based on Employer Regulatory Compliance inbound process agent 1330 to update the DE_Employee Payroll Input business object 322. The DE_Employee Payroll Input business object 322 represents a summary of employee-specific input for German payroll for one employee.

Interactions between Process Components "Compensation Management" and "Payroll Processing"

Figure 14:
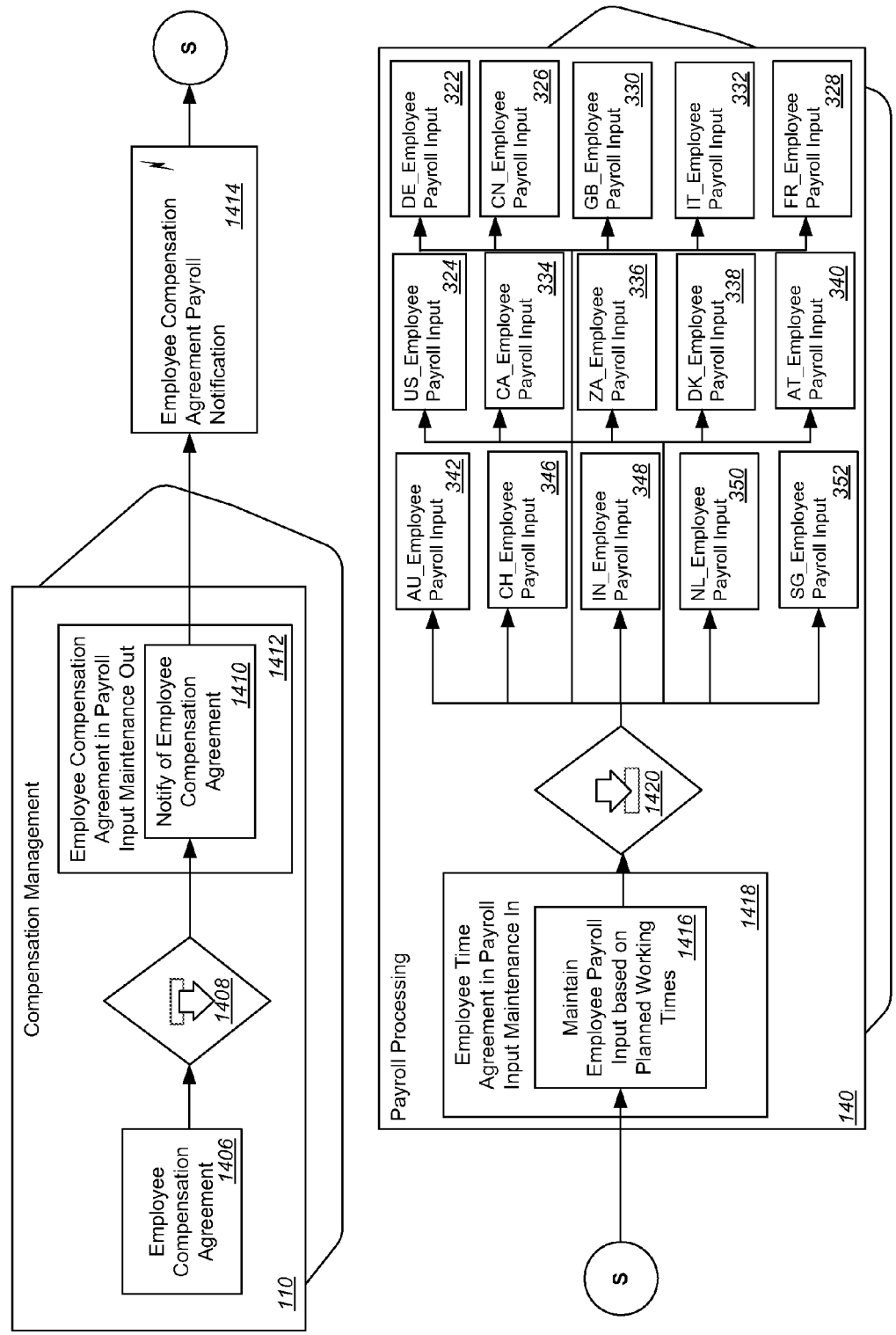
FIG. 14 is a block diagram showing interactions between a Compensation Management process component and the Payroll Processing process component.

FIG. 14 is a block diagram showing interactions between the Compensation Management process component 110 and the Payroll Processing process component 140 in the architectural design of FIG. 1.

As shown in FIG. 7, the Compensation Management process component 110 includes an Employee Compensation Agreement business object 1406. The Employee Compensation Agreement business object 1406 represents an agreement between an employer and an employee detailing compensation components that are relevant to the employee, such as base salary, one-time and recurring payments, and payments for employee benefits. Also part of this agreement can be the assignment of a Compensation Structure Grade which shall be valid for the employee.

The Employee Compensation Agreement business object 1406 uses a Notify of Employee Compensation Agreement to Payroll Processing outbound process agent 1408 to invoke a Notify of Employee Compensation Agreement operation 1410. The operation 1410 is included in an Employee Compensation Agreement in Payroll Input Maintenance Out interface 1412. The operation 1410 provides notification about the agreement between an employer and an employee detailing compensation components that are relevant to the employee. The operation 1410 generates an Employee Compensation Agreement Payroll Notification message 1414.

A Maintain Employee Payroll Input based on Employee Compensation Agreement operation 1416 receives the Employee Compensation Agreement Payroll Notification message 1414. The operation 1416 is included in an Employee Compensation Agreement in Payroll Input Maintenance In interface 1418. The operation 1416 maintains country-specific Employee Payroll Input business objects based on the country in which an employee is employed. The operation 1416 uses a Maintain Employee Payroll Input based on Employee Compensation Agreement inbound process agent 1420 to update a DE_Employee Payroll Input business object 322, a US_Employee Payroll Input business object 324, a CN_Employee Payroll Input business object 326, an FR_Employee Payroll Input business object 328, a GB_Employee Payroll Input business object 330, an IT_Employee Payroll Input business object 332, a CA_Employee Payroll Input business object 334, a ZA_Employee Payroll Input business object 336, a DK_Employee Payroll Input business object 338, an AT_Employee Payroll Input business object 340, an AU_Employee Payroll Input business object 342, a CH_Employee Payroll Input business object 346, an IN_Employee Payroll Input business object 348, an NL_Employee Payroll Input business object 350, or an SG_Employee Payroll Input business object 352.

The DE_Employee Payroll Input business object 322 represents a summary of employee-specific input for German payroll for one employee. The US_Employee Payroll Input business object 324 represents a summary of employee-specific input for US payroll for one employee. The CN_Employee Payroll Input business object 326 represents a summary of employee-specific input for Chinese payroll for one employee. The FR_Employee Payroll Input business object 328 represents a summary of employee-specific input for French payroll for one employee. The GB_Employee Payroll Input business object 330 represents a summary of employee-specific input for GB payroll for one employee. The IT_Employee Payroll Input business object 332 represents a summary of employee-specific input for Italian payroll for one employee. The CA_Employee Payroll Input business object 334 represents a summary of employee specific input for Canadian payroll. The ZA_Employee Payroll Input business object 336 represents a summary of employee specific input for South African payroll. The DK_Employee Payroll Input business object 338 represents a summary of employee specific input for Danish payroll. The AT_Employee Payroll Input business object 340 represents a summary of employee specific input for Austrian payroll for one employee. The AU_Employee Payroll Input business object 342 represents a summary of employee specific input for Australian payroll. The CH_Employee Payroll Input business object 346 represents a summary of employee specific input for Swiss payroll for one employee. The IN_Employee Payroll Input business object 348 represents a summary of employee specific input for Indian payroll for one employee. The NL_Employee Payroll Input business object 350 represents a summary of employee specific input for Dutch payroll. The SG_Employee Payroll Input business object 352 represents a summary of employee specific input for Singaporean payroll.

Interactions between Process Components "US Employer Regulatory Compliance" and "Payroll Processing"

Figure 15:
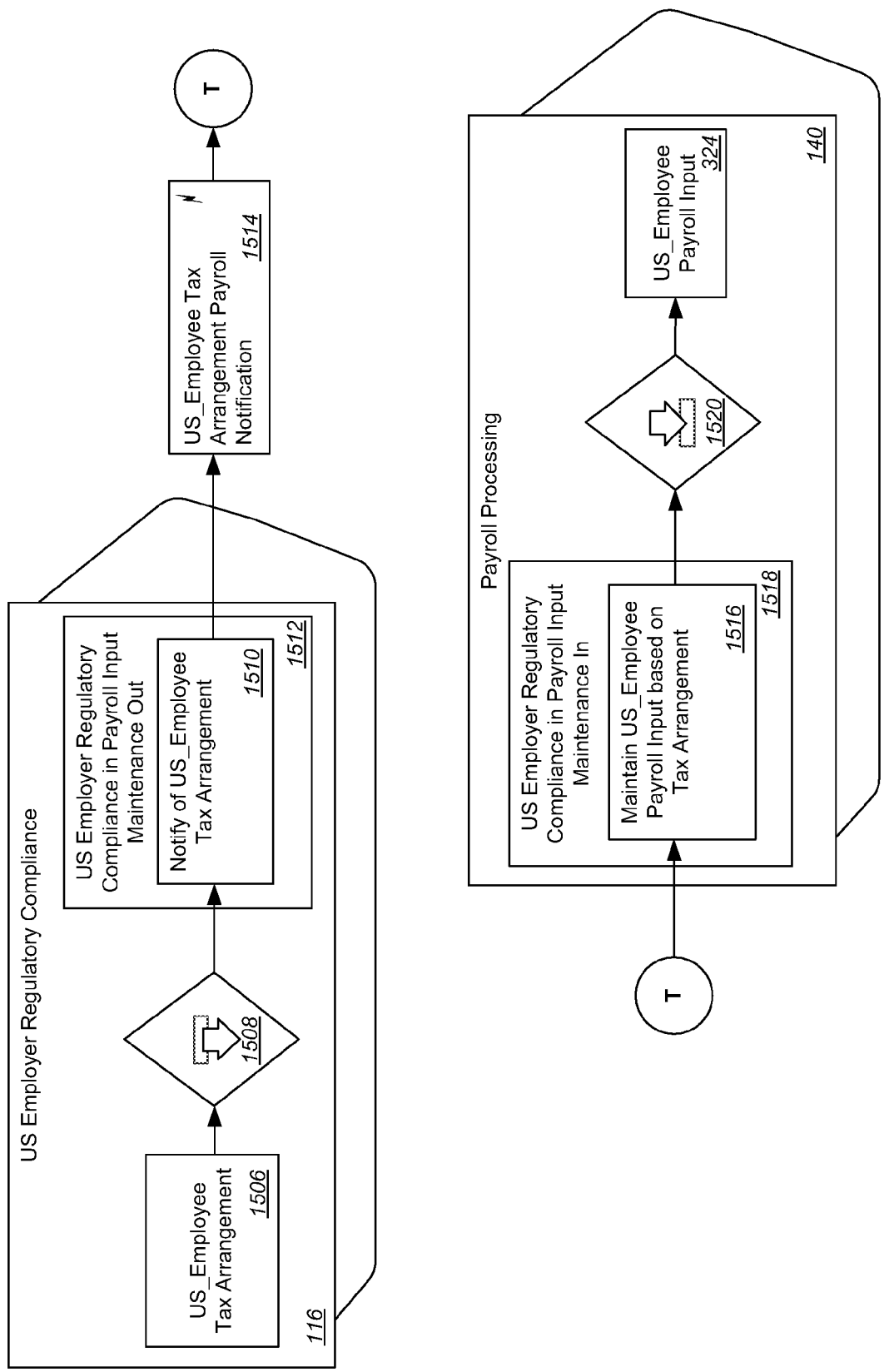
FIG. 15 is a block diagram showing interactions between a US Employer Regulatory Compliance process component and the Payroll Processing process component.

FIG. 15 is a block diagram showing interactions between the US Employer Regulatory Compliance process component 116 and the Payroll Processing process component 140 in the architectural design of FIG. 1.

As shown in FIG. 15, the US Employer Regulatory Compliance process component 116 includes a US_Employee Tax Arrangement business object 1506. The US_Employee Tax Arrangement business object 1506 represents an arrangement by the responsible tax authorities for the employee concerning calculation and reporting of withholding tax according to US federal, state, and local legal requirements.

The US_Employee Tax Arrangement business object 1506 uses a Notify of US_Employee Tax Arrangement to Payroll Processing outbound process agent 1508 to invoke a Notify of US_Employee Tax Arrangement operation 1510. The operation 1510 is included in a US Employer Regulatory Compliance in Payroll Input Maintenance Out interface 1512. The operation 1510 provides notification about new or changed tax data for a US Employee. The operation 1510 generates a US_Employee Tax Arrangement Payroll Notification message 1514.

A Maintain US_Employee Payroll Input based on Tax Arrangement operation 1516 receives the US_Employee Tax Arrangement Payroll Notification message 1514. The operation 1516 is included in a US Employer Regulatory Compliance in Payroll Input Maintenance In interface 1518. The operation 1516 maintains information on an employee's US tax arrangement. The operation 1516 uses a Maintain US_Employee Payroll Input based on Employer Regulatory Compliance inbound process agent 1520 to update the US_Employee Payroll Input business object 324. The US_Employee Payroll Input business object 324 represents a summary of all employee-specific input for US payroll for one employee.

Interactions between Process Components "NL Employer Regulatory Compliance" and "Payroll Processing"

Figure 16:
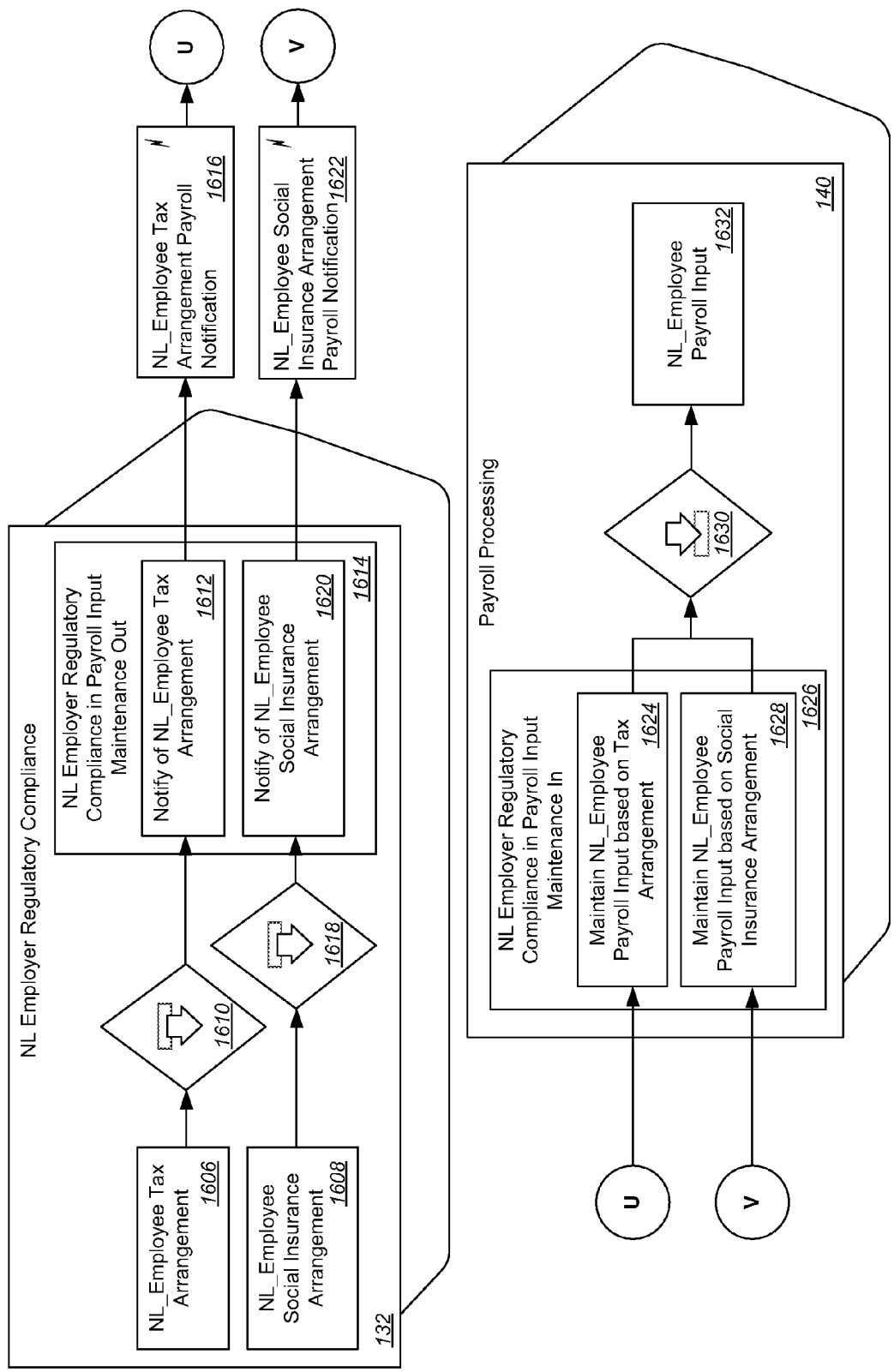
FIG. 16 is a block diagram showing interactions between an NL Employer Regulatory Compliance process component and the Payroll Processing process component.

FIG. 16 is a block diagram showing interactions between the NL Employer Regulatory Compliance process component 132 and the Payroll Processing process component 140 in the architectural design of FIG. 1.

As shown in FIG. 16, the NL Employer Regulatory Compliance process component 132 includes an NL_Employee Tax Arrangement business object 1606 and an NL_Employee Social Insurance Arrangement business object 1608. The NL_Employee Tax Arrangement business object 1606 represents an arrangement between the employee and the tax authorities of the Netherlands that defines the rules of how the employer must calculate and report taxes for this employee to be compliant with the legal requirements of the Netherlands. The NL_Employee Social Insurance Arrangement business object 1608 represents an arrangement for the employee by responsible Dutch bodies that are legally responsible for administering the employee's social insurance contributions. This arrangement concerns the information required for calculation of Dutch social insurance contributions and reporting according to the legal requirements of the Netherlands.

The NL_Employee Tax Arrangement business object 1606 uses a Notify of NL_Employee Tax Arrangement to Payroll Processing outbound process agent 1610 to invoke a Notify of NL_Employee Tax Arrangement operation 1612. The operation 1612 is included in an NL Employer Regulatory Compliance in Payroll Input Maintenance Out interface 1614. The operation 1612 provides notification about new or changed tax data for an NL employee. The operation 1612 generates an NL_Employee Tax Arrangement Payroll Notification message 1616.

The NL_Employee Social Insurance Arrangement business object 1608 uses a Notify of NL_Employee Social Insurance Arrangement to Payroll Processing outbound process agent 1618 to invoke a Notify of NL_Employee Social Insurance Arrangement operation 1620. The operation 1620 is included in the NL Employer Regulatory Compliance in Payroll Input Maintenance Out interface 1614. The operation 1620 provides notification about new or changed social insurance data for an NL employee. The operation 1620 generates an NL_Employee Social Insurance Arrangement Payroll Notification message 1622.

A Maintain NL_Employee Payroll Input based on Tax Arrangement operation 1624 receives the NL_Employee Tax Arrangement Payroll Notification message 1616. The operation 1624 is included in an NL Employer Regulatory Compliance in Payroll Input Maintenance In interface 1626. The operation 1624 maintains information on an employee's NL tax arrangement.

A Maintain NL_Employee Payroll Input based on Social Insurance Arrangement operation 1628 receives the NL_Employee Social Insurance Arrangement Payroll Notification message 1622. The operation 1628 is included in the NL Employer Regulatory Compliance in Payroll Input Maintenance In interface 1626. The operation 1628 maintains information on an employee's NL social insurance arrangement.

The Maintain NL_Employee Payroll Input based on Tax Arrangement operation 1624 and the Maintain NL_Employee Payroll Input based on Social Insurance Arrangement operation 1628 use a Maintain NL_Employee Payroll Input based on Employer Regulatory Compliance inbound process agent 1630 to update an NL_Employee Payroll Input business object 1632. The NL_Employee Payroll Input business object 1632 represents a summary of employee specific input for Dutch payroll.

Interactions between Process Components "IT Employer Regulatory Compliance" and "Payroll Processing"

Figure 17:
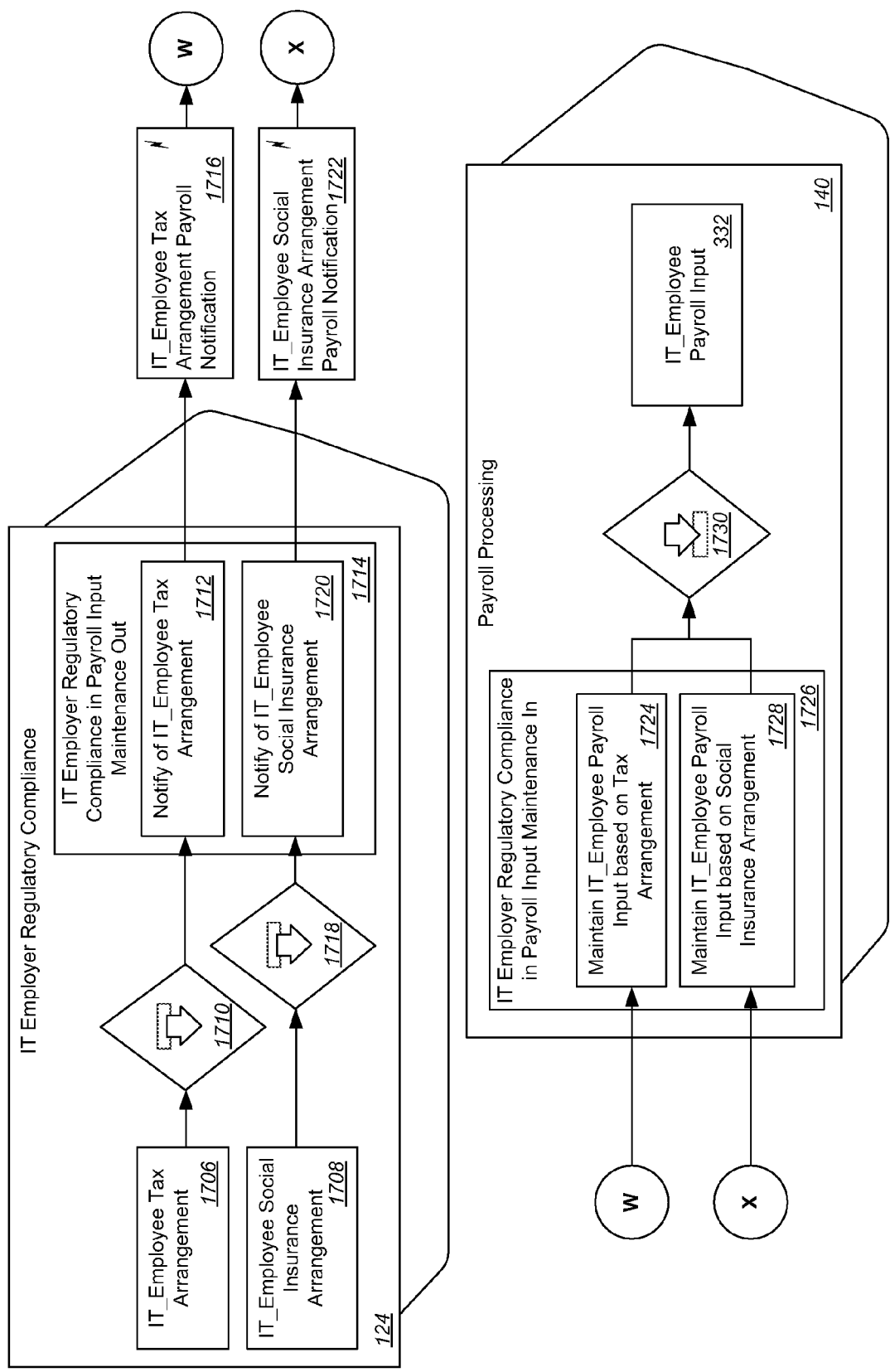
FIG. 17 is a block diagram showing interactions between an IT Employer Regulatory Compliance process component and the Payroll Processing process component.

FIG. 17 is a block diagram showing interactions between the IT Employer Regulatory Compliance process component 124 and the Payroll Processing process component 140 in the architectural design of FIG. 1.

As shown in FIG. 17, the IT Employer Regulatory Compliance process component 124 includes an IT_Employee Tax Arrangement business object 1706 and an IT_Employee Social Insurance Arrangement business object 1708. The IT_Employee Tax Arrangement business object 1706 represents an arrangement by the responsible tax authorities for the employee concerning calculation and reporting of income tax deductions according to Italian legal requirements. The IT_Employee Social Insurance Arrangement business object 1708 represents an arrangement for the employee by the Italian bodies that are legally responsible for administering the employee's social insurance contributions and benefits. This arrangement concerns the information required for calculation of Italian social insurance contributions and reporting according to the Italian's Social Insurance bodies.

The IT_Employee Tax Arrangement business object 1706 uses a Notify of IT_Employee Tax Arrangement to Payroll Processing outbound process agent 1710 to invoke a Notify of IT_Employee Tax Arrangement operation 1712. The operation 1712 is included in an IT Employer Regulatory Compliance in Payroll Input Maintenance Out interface 1714. The operation 1712 provides notification about new or changed tax data for an IT employee. The operation 1712 generates an IT_Employee Tax Arrangement Payroll Notification message 1716.

The IT_Employee Social Insurance Arrangement business object 1708 uses a Notify of IT_Employee Social Insurance Arrangement to Payroll Processing outbound process agent 1718 to invoke a Notify of IT_Employee Social Insurance Arrangement operation 1720. The operation 1720 is included in the IT Employer Regulatory Compliance in Payroll Input Maintenance Out interface 1714. The operation 1720 provides notification about new or changed social insurance data for an IT employee. The operation 1720 generates an IT_Employee Social Insurance Arrangement Payroll Notification message 1722.

A Maintain IT_Employee Payroll Input based on Tax Arrangement operation 1724 receives the IT_Employee Tax Arrangement Payroll Notification message 1716. The operation 1724 is included in an IT Employer Regulatory Compliance in Payroll Input Maintenance In interface 1726. The operation 1724 maintains information on an employee's IT tax arrangement.

A Maintain IT_Employee Payroll Input based on Social Insurance Arrangement operation 1728 receives the IT_Employee Social Insurance Arrangement Payroll Notification message 1722. The operation 1728 is included in the IT Employer Regulatory Compliance in Payroll Input Maintenance In interface 1726. The operation 1728 maintains information on an employee's IT social insurance arrangement.

The Maintain IT_Employee Payroll Input based on Tax Arrangement operation 1724 and the Maintain IT_Employee Payroll Input based on Social Insurance Arrangement operation 1728 use a Maintain IT_Employee Payroll Input based on Employer Regulatory Compliance inbound process agent 1730 to update the IT_Employee Payroll Input business object 332. The IT_Employee Payroll Input business object 332 represents a summary of employee specific input for Italian payroll for one employee.

Interactions between Process Components "AT Employer Regulatory Compliance" and "Payroll Processing"

Figure 18:
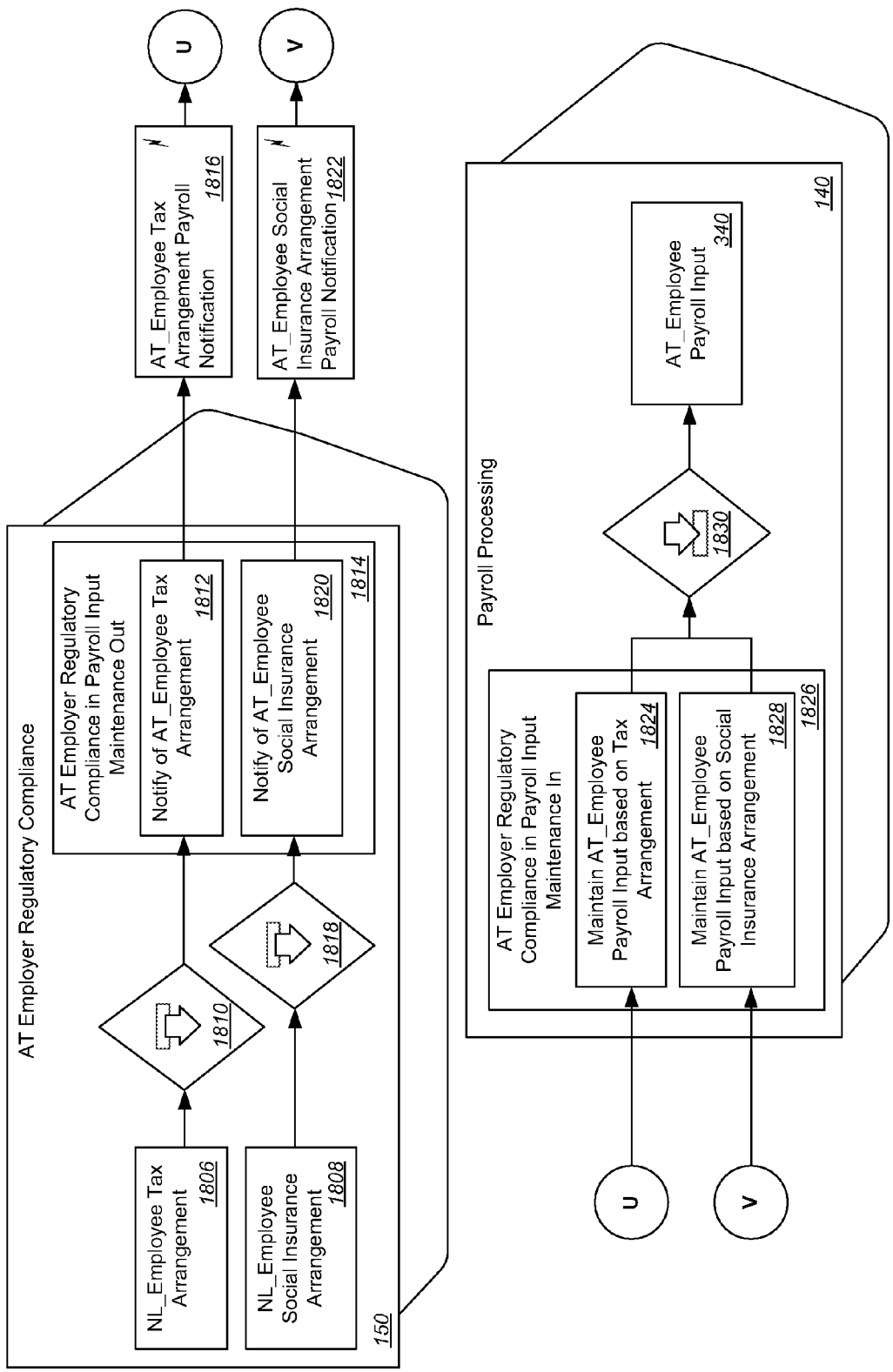
FIG. 18 is a block diagram showing interactions between an AT Employee Regulatory Compliance process component and a Payroll Processing process component.

FIG. 18 is a block diagram showing interactions between an AT Employee Regulatory Compliance process component and a Payroll Processing process component in the architectural design of FIG. 1.

As shown in FIG. 18, the AT Employer Regulatory Compliance process component 150 includes an AT_Employee Tax Arrangement business object 1806 and an AT_Employee Social Insurance Arrangement business object 1808. The AT_Employee Tax Arrangement business object 1806 represents an arrangement between the employee and the tax authorities of Austria that defines the rules of how the employer calculates and reports taxes for this employee to be compliant with the legal requirements of Austria. The AT_Employee Social Insurance Arrangement business object 1808 represents an arrangement for the employee by responsible Austrian bodies that are legally responsible for administering the employee's social insurance contributions.

The AT_Employee Tax Arrangement business object 1806 uses a Notify of AT_Employee Tax Arrangement to Payroll Processing outbound process agent 1810 to invoke a Notify of AT_Employee Tax Arrangement operation 1812. The operation 1812 is included in an AT Employer Regulatory Compliance in Payroll Input Maintenance Out interface 1814. The operation 1812 provides notification about new or changed tax data for an Austrian employee. The operation 1812 generates an AT_Employee Tax Arrangement Payroll Notification message 1816.

The AT_Employee Social Insurance Arrangement business object 1808 uses a Notify of AT_Employee Social Insurance Arrangement to Payroll Processing outbound process agent 1818 to invoke a Notify of AT_Employee Social Insurance Arrangement operation 1820. The operation 1820 is included in the AT Employer Regulatory Compliance in Payroll Input Maintenance Out interface 1814. The operation 1820 provides notification about new or changed social insurance data for an Austrian employee. The operation 1820 generates an AT_Employee Social Insurance Arrangement Payroll Notification message 1822.

A Maintain AT_Employee Payroll Input based on Tax Arrangement operation 1824 receives the AT_Employee Tax Arrangement Payroll Notification message 1816. The operation 1824 is included in an AT Employer Regulatory Compliance in Payroll Input Maintenance In interface 1826. The operation 1824 maintains information on an employee's Austrian tax arrangement.

A Maintain AT_Employee Payroll Input based on Social Insurance Arrangement operation 1828 receives the AT_Employee Social Insurance Arrangement Payroll Notification message 1822. The operation 1828 is included in the AT Employer Regulatory Compliance in a Payroll Input Maintenance In interface 1826. The operation 1828 maintains information on an employee's Austrian social insurance arrangement.

The Maintain AT_Employee Payroll Input based on Tax Arrangement operation 1824 and the Maintain AT_Employee Payroll Input based on Social Insurance Arrangement operation 1828 use a Maintain AT_Employee Payroll Input based on Employer Regulatory Compliance inbound process agent 1830 to update an AT_Employee Payroll Input business object 1832. The AT_Employee Payroll Input business object 1832 represents a summary of employee specific input for Austrian payroll.

Interactions between Process Components "CH Employer Regulatory Compliance" and "Payroll Processing"

Figure 19:
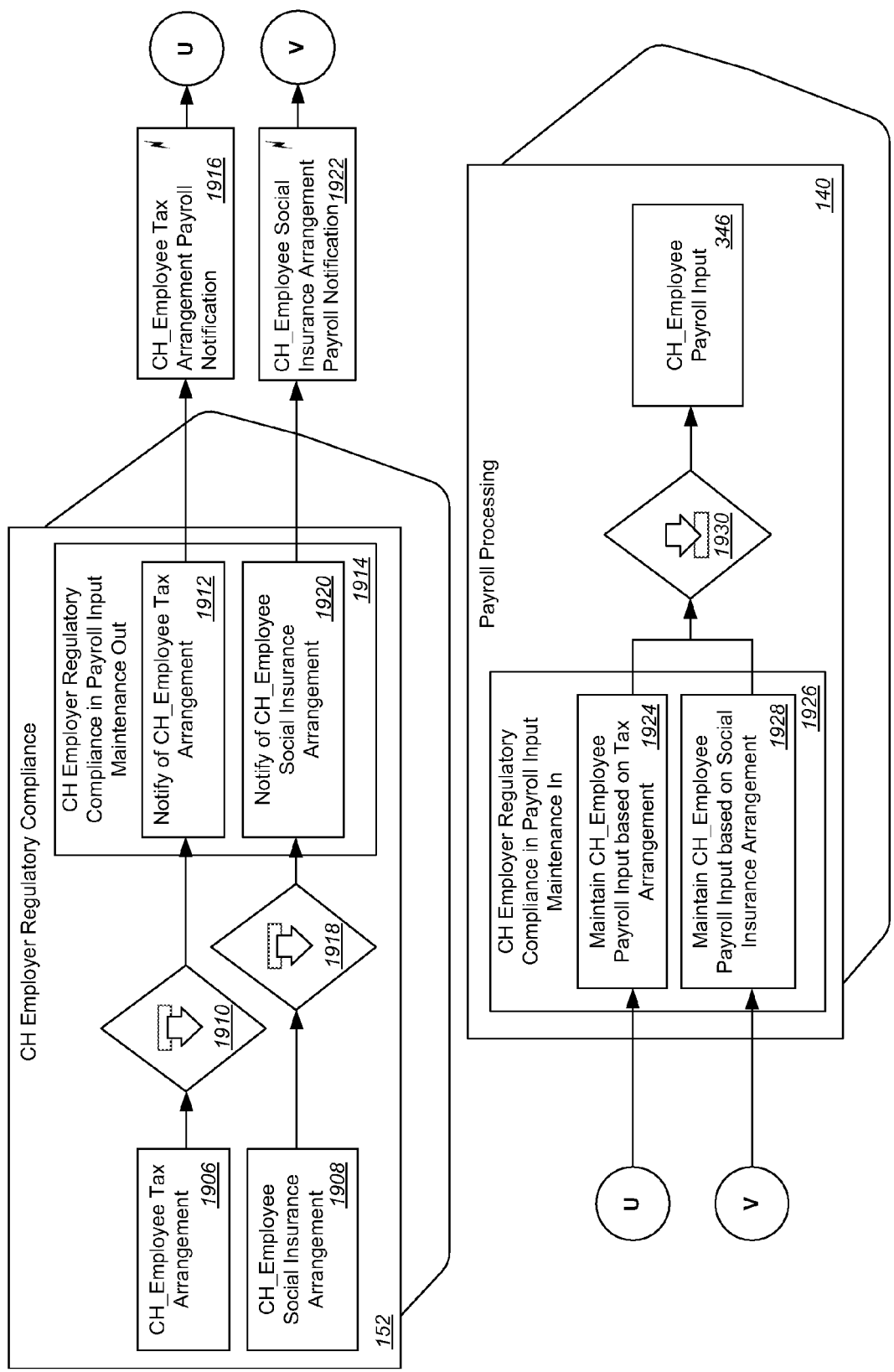
FIG. 19 is a block diagram showing interactions between a CH Employee Regulatory Compliance process component and a Payroll Processing process component.

FIG. 19 is a block diagram showing interactions between a CH Employee Regulatory Compliance process component and a Payroll Processing process component in the architectural design of FIG. 1.

As shown in FIG. 19, the CH Employer Regulatory Compliance process component 152 includes a CH_Employee Tax Arrangement business object 1906 and a CH_Employee Social Insurance Arrangement business object 1908. The CH_Employee Tax Arrangement business object 1906 represents an arrangement between the employee and the tax authorities of Switzerland that defines the rules of how the employer calculates and reports taxes for this employee to be compliant with the legal requirements of Switzerland. The CH_Employee Social Insurance Arrangement business object 1908 represents an arrangement for the employee by responsible Swiss bodies that are legally responsible for administering the employee's social insurance contributions.

The CH_Employee Tax Arrangement business object 1906 uses a Notify of CH_Employee Tax Arrangement to Payroll Processing outbound process agent 1910 to invoke a Notify of CH_Employee Tax Arrangement operation 1912. The operation 1912 is included in a CH Employer Regulatory Compliance in Payroll Input Maintenance Out interface 1914. The operation 1912 provides notification about new or changed tax data for a Swiss employee. The operation 1912 generates a CH_Employee Tax Arrangement Payroll Notification message 1916.

The CH_Employee Social Insurance Arrangement business object 1908 uses a Notify of CH_Employee Social Insurance Arrangement to Payroll Processing outbound process agent 1918 to invoke a Notify of CH_Employee Social Insurance Arrangement operation 1920. The operation 1920 is included in the CH Employer Regulatory Compliance in the Payroll Input Maintenance Out interface 1914. The operation 1920 provides notification about new or changed social insurance data for a Swiss employee. The operation 1920 generates a CH_Employee Social Insurance Arrangement Payroll Notification message 1922.

A Maintain CH_Employee Payroll Input based on Tax Arrangement operation 1924 receives the CH_Employee Tax Arrangement Payroll Notification message 1916. The operation 1924 is included in a CH Employer Regulatory Compliance in Payroll Input Maintenance In interface 1926. The operation 1924 maintains information on an employee's Swiss tax arrangement.

A Maintain CH_Employee Payroll Input based on Social Insurance Arrangement operation 1928 receives the CH_Employee Social Insurance Arrangement Payroll Notification message 1922. The operation 1928 is included in the CH Employer Regulatory Compliance in a Payroll Input Maintenance In interface 1926. The operation 1928 maintains information on an employee's Swiss social insurance arrangement.

The Maintain CH_Employee Payroll Input based on Tax Arrangement operation 1924 and the Maintain CH_Employee Payroll Input based on Social Insurance Arrangement operation 1928 use a Maintain CH_Employee Payroll Input based on Employer Regulatory Compliance inbound process agent 1930 to update an CH_Employee Payroll Input business object 346. The CH_Employee Payroll Input business object 346 represents a summary of employee specific input for Swiss payroll.

Interactions between Process Components "IN Employer Regulatory Compliance" and "Payroll Processing"

Figure 20:
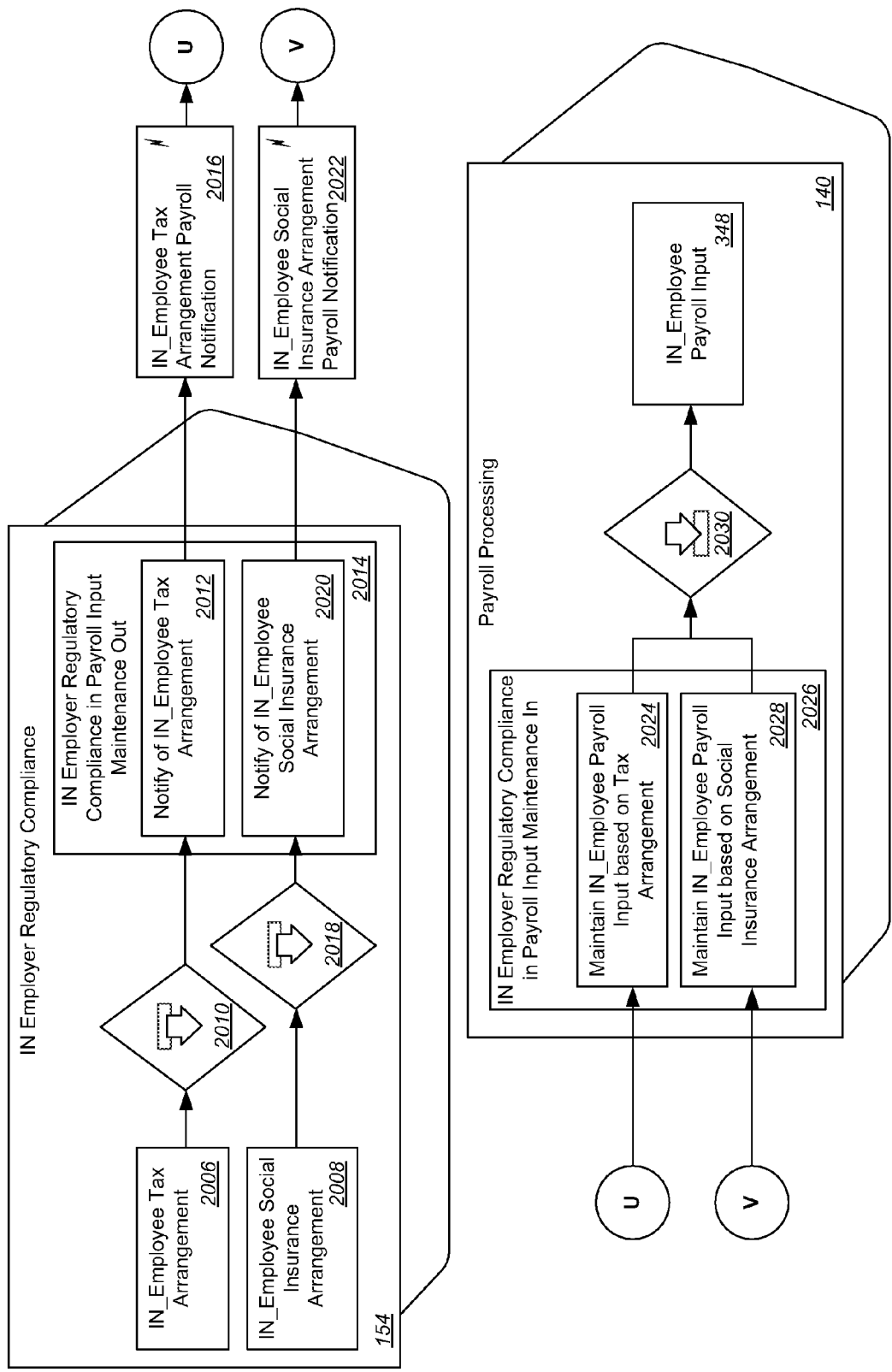
FIG. 20 is a block diagram showing interactions between an IN Employee Regulatory Compliance process component and a Payroll Processing process component.

FIG. 20 is a block diagram showing interactions between an IN Employee Regulatory Compliance process component and a Payroll Processing process component in the architectural design of FIG. 1.

As shown in FIG. 20, the IN Employer Regulatory Compliance process component 154 includes an IN_Employee Tax Arrangement business object 2006 and an IN_Employee Social Insurance Arrangement business object 2008. The IN_Employee Tax Arrangement business object 2006 represents an arrangement between the employee and the tax authorities of India that defines the rules of how the employer calculates and reports taxes for this employee to be compliant with the legal requirements of India. The IN_Employee Social Insurance Arrangement business object 2008 represents an arrangement for the employee by responsible Indian bodies that are legally responsible for administering the employee's social insurance contributions.

The IN_Employee Tax Arrangement business object 2006 uses a Notify of IN_Employee Tax Arrangement to Payroll Processing outbound process agent 2010 to invoke a Notify of IN_Employee Tax Arrangement operation 2012. The operation 2012 is included in an IN Employer Regulatory Compliance in Payroll Input Maintenance Out interface 2014. The operation 2012 provides notification about new or changed tax data for an Indian employee. The operation 2012 generates an IN_Employee Tax Arrangement Payroll Notification message 2016.

The IN_Employee Social Insurance Arrangement business object 2008 uses a Notify of IN_Employee Social Insurance Arrangement to Payroll Processing outbound process agent 2018 to invoke a Notify of IN_Employee Social Insurance Arrangement operation 2020. The operation 2020 is included in the IN Employer Regulatory Compliance in Payroll Input Maintenance Out interface 2014. The operation 2020 provides notification about new or changed social insurance data for an Indian employee. The operation 2020 generates an IN_Employee Social Insurance Arrangement Payroll Notification message 2022.

A Maintain IN_Employee Payroll Input based on Tax Arrangement operation 2024 receives the IN_Employee Tax Arrangement Payroll Notification message 2016. The operation 2024 is included in an IN Employer Regulatory Compliance in Payroll Input Maintenance In interface 2026. The operation 2024 maintains information on an employee's Indian tax arrangement.

A Maintain IN_Employee Payroll Input based on Social Insurance Arrangement operation 2028 receives the IN_Employee Social Insurance Arrangement Payroll Notification message 2022. The operation 2028 is included in the IN Employer Regulatory Compliance in a Payroll Input Maintenance In interface 2026. The operation 2028 maintains information on an employee's Indian social insurance arrangement.

The Maintain IN_Employee Payroll Input based on Tax Arrangement operation 2024 and the Maintain IN_Employee Payroll Input based on Social Insurance Arrangement operation 2028 use a Maintain IN_Employee Payroll Input based on Employer Regulatory Compliance inbound process agent 2030 to update an IN_Employee Payroll Input business object 348. The IN_Employee Payroll Input business object 348 represents a summary of employee specific input for Indian payroll.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of a data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the present disclosure or of what may be claimed, but rather as an exemplification of preferred embodiments of the present disclosure. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising application software encoded on a tangible machine-readable information carrier, the application software being structured as process components interacting with each other through service interfaces, the software comprising:

a plurality of process components, each of the process components being a package of software implementing a respective and distinct business process, the plurality of process components including:

a payroll processing process component that handles execution and monitoring of regular and off-cycle payroll processes;

a time and labor management process component that handles management of employees' planned working times, and recording and valuation of work performed and absence times;

a compensation management process component that handles planning and specification of compensation data for employees using appropriate reward strategies based on predefined compensation structures and components;

an employee payroll administration process component that handles administration of employee specific payroll agreements and overview of completed and planned payroll processes;

a DE employer regulatory compliance process component that handles administration of employee data and reporting to authorities that employers in Germany are legally obligated to perform;

a US employer regulatory compliance process component that handles administration of employee data and reporting to authorities that employers in the United States of America are legally obligated to perform;

a CN employer regulatory compliance process component that handles reporting and other administrative activities that employers in China, with respect to employees, are legally obligated to perform;

an FR employer regulatory compliance process component that handles administration of employee data and reporting to authorities that employers in France are legally obligated to perform;

a GB employer regulatory compliance process component that handles administration of employee data and reporting to authorities that employers in the United Kingdom are legally obligated to perform;

an IT employer regulatory compliance process component that handles administration of employee data and reporting to authorities that employers in Italy are legally obligated to perform;

an AU employer regulatory compliance process component that handles activities an employer in Australia is obliged to perform with respect to employees;

a CA employer regulatory compliance process component that handles activities an employer in Canada is obliged to perform with respect to employees;

a DK employer regulatory compliance process component that handles reporting and other administrative activities that an employer in Denmark is obliged to perform with respect to employees;

an NL employer regulatory compliance process component that handles activities an employer in the Netherlands is obliged to perform with respect to employees;

an SG employer regulatory compliance process component that handles activities an employer in Singapore is obliged to perform with respect to employees;

a ZA employer regulatory compliance process component that handles activities an employer in South Africa is obliged to perform with respect to employees;

an AT employer regulatory compliance process component that handles the combination of activities an employer in Austria is obliged to perform with respect to employees;

a CH employer regulatory compliance process component that handles the combination of activities an employer in Switzerland is obliged to perform with respect to employees; and an IN employer regulatory compliance process component that handles the combination of activities an employer in India is obliged to perform with respect to employees; and a plurality of service operations, each service operation being implemented for a respective process component, the operations comprising inbound and outbound operations, the outbound operation for a first process component being operable to send a message to a second process component of the plurality of process components, the second process component having an inbound operation for receiving the message, the passing of messages between an inbound and an outbound operation defining a message-based pair-wise interaction between the respective process components of the respective operations, the pair-wise interactions between pairs of the process components including interactions between:

the time and labor management process component and the payroll processing process component;

the AU employer regulatory compliance process component and the payroll processing process component;

the FR employer regulatory compliance process component and the payroll processing process component;

the GB employer regulatory compliance process component and the payroll processing process component;

the employee payroll administration process component and the payroll processing process component;

the DK employer regulatory compliance process component and the payroll processing process component;

the CN employer regulatory compliance process component and the payroll processing process component;

the SG employer regulatory compliance process component and the payroll processing process component;

the ZA employer regulatory compliance process component and the payroll processing process component;

the CA employer regulatory compliance process component and the payroll processing process component;

the DE employer regulatory compliance process component and the payroll processing process component;

the compensation management process component and the payroll processing process component;

the US employer regulatory compliance process component and the payroll processing process component;

the AT employer regulatory compliance process component and the payroll processing process component;

the CH employer regulatory compliance process component and the payroll processing process component;

the IN employer regulatory compliance process component and the payroll processing process component;

the NL employer regulatory compliance process component and the payroll processing process component; and the IT employer regulatory compliance process component and the payroll processing process component.

2. The product of claim 1, wherein:

the plurality of process components further includes:

a personnel administration process component that handles administration of personnel changes concerning employee master data and work agreements;

a business partner data management process component that handles management of business partner master data of a company;

an identity management process component that handles identification of individuals in a system landscape and controlling their access by associating user rights and restrictions;

a human capital master data management process component that handles management of work agreements, employments, and human capital master data; and an expense and reimbursement management process component that handles management and monitoring of expenses incurred by employees, and reimbursement of such expenses to employees; and wherein:

the pair-wise interactions between pairs of the process components further include interactions between:

the personnel administration process component and the business partner data management process component;

the personnel administration process component and the human capital master data management process component;

the business partner data management process component and the identity management process component;

the human capital master data management process component and the expense and reimbursement management process component;

the human capital master data management process component and the time and labor management process component;

the human capital master data management process component and the compensation management process component;

the human capital master data management process component and the employee payroll administration process component;

the human capital master data management process component and the DE employer regulatory compliance process component;

the human capital master data management process component and the US employer regulatory compliance process component;

the human capital master data management process component and the CN employer regulatory compliance process component;

the human capital master data management process component and the FR employer regulatory compliance process component;

the human capital master data management process component and the GB employer regulatory compliance process component;

the human capital master data management process component and the IT employer regulatory compliance process component;

the human capital master data management process component and the AU employer regulatory compliance process component;

the human capital master data management process component and the CA employer regulatory compliance process component;

the human capital master data management process component and the DK employer regulatory compliance process component;

the human capital master data management process component and the NL employer regulatory compliance process component;

the human capital master data management process component and the SG employer regulatory compliance process component; and the human capital master data management process component and the ZA employer regulatory compliance process component.

3. The product of claim 1, wherein:

each of the plurality of process components is assigned to exactly one deployment unit among multiple deployment units, and each deployment unit is deployable on a separate computer hardware platform independent of every other deployment unit; and all interaction between a process component in one deployment unit and any other process component in any other deployment unit takes place through the respective service interfaces of the two process components.

4. The product of claim 3, wherein the deployment units comprise:

a human capital management deployment unit that includes the time and labor management process component, the compensation management process component, the employee payroll administration process component, the DE employer regulatory compliance process component, the US employer regulatory compliance process component, the CN employer regulatory compliance process component, the FR employer regulatory compliance process component, the GB employer regulatory compliance process component, the IT employer regulatory compliance process component, the AU employer regulatory compliance process component, the CA employer regulatory compliance process component, the DK employer regulatory compliance process component, the NL employer regulatory compliance process component, the SG employer regulatory compliance process component, the ZA employer regulatory compliance process component, the AT employer regulatory compliance process component, the CH employer regulatory compliance process component, the IN employer regulatory compliance process component, and the personnel administration process component;

a payroll deployment unit that includes the payroll processing process component; and an expense and reimbursement management deployment unit that includes the expense and reimbursement management process component.

5. The product of claim 1, wherein:

each of the process components includes one or more business objects; and none of the business objects of any one of the process components interacts directly with any of the business objects included in any of the other process components.

6. The product of claim 5, wherein the business objects comprise a business process object.

7. The product of claim 5, wherein none of the business objects included in any one of the process components is included in any of the other process components.

8. The product of claim 1, further comprising a plurality of process agents, each process agent being either an inbound process agent or an outbound process agent, an inbound process agent being operable to receive a message from an inbound operation, an outbound process agent being operable to cause an outbound operation to send a message and each process agent being associated with exactly one process component.

9. The product of claim 8, wherein the inbound process agents comprise a first inbound process agent operable to start the execution of a business process step requested in a first inbound message by creating or updating one or more business object instances.

10. The product of claim 8, wherein the outbound process agents comprise a first asynchronous outbound process agent that is called after a business object that is associated with the first outbound process agent changes.

11. The product of claim 1, wherein the operations comprise synchronous and asynchronous operations.

12. A system comprising:

a computer system comprising one or more hardware platforms for executing a computer software application;

a plurality of process components, each of the process components being a package of software implementing a respective and distinct business process, the plurality of process components including:

a payroll processing process component that handles execution and monitoring of regular and off-cycle payroll processes;

a time and labor management process component that handles management of employees' planned working times, and recording and valuation of work performed and absence times;

a compensation management process component that handles planning and specification of compensation data for employees using appropriate reward strategies based on predefined compensation structures and components;

an employee payroll administration process component that handles administration of employee specific payroll agreements and overview of completed and planned payroll processes;

a DE employer regulatory compliance process component that handles administration of employee data and reporting to authorities that employers in Germany are legally obligated to perform;

a US employer regulatory compliance process component that handles administration of employee data and reporting to authorities that employers in the United States of America are legally obligated to perform;

a CN employer regulatory compliance process component that handles reporting and other administrative activities that employers in China, with respect to employees, are legally obligated to perform;

an FR employer regulatory compliance process component that handles administration of employee data and reporting to authorities that employers in France are legally obligated to perform;

a GB employer regulatory compliance process component that handles administration of employee data and reporting to authorities that employers in the United Kingdom are legally obligated to perform;

an IT employer regulatory compliance process component that handles administration of employee data and reporting to authorities that employers in Italy are legally obligated to perform;

an AU employer regulatory compliance process component that handles activities an employer in Australia is obliged to perform with respect to employees;

a CA employer regulatory compliance process component that handles activities an employer in Canada is obliged to perform with respect to employees;

a DK employer regulatory compliance process component that handles reporting and other administrative activities that an employer in Denmark is obliged to perform with respect to employees;

an NL employer regulatory compliance process component that handles activities an employer in the Netherlands is obliged to perform with respect to employees;

an SG employer regulatory compliance process component that handles activities an employer in Singapore is obliged to perform with respect to employees; and a ZA employer regulatory compliance process component that handles activities an employer in South Africa is obliged to perform with respect to employees;

an AT employer regulatory compliance process component that handles the combination of activities an employer in Austria is obliged to perform with respect to employees;

a CH employer regulatory compliance process component that handles the combination of activities an employer in Switzerland is obliged to perform with respect to employees; and an IN employer regulatory compliance process component that handles the combination of activities an employer in India is obliged to perform with respect to employees; and a plurality of service operations, each service operation being implemented for a respective process component, the operations comprising inbound and outbound operations, the outbound operation for a first process component being operable to send a message to a second process component of the plurality of process components, the second process component having an inbound operation for receiving the message, the passing of messages between an inbound and an outbound operation defining a message-based pair-wise interaction between the respective process components of the respective operations, the pair-wise interactions between pairs of the process components including interactions between:

the time and labor management process component and the payroll processing process component;

the AU employer regulatory compliance process component and the payroll processing process component;

the FR employer regulatory compliance process component and the payroll processing process component;

the GB employer regulatory compliance process component and the payroll processing process component;

the employee payroll administration process component and the payroll processing process component;

the DK employer regulatory compliance process component and the payroll processing process component;

the CN employer regulatory compliance process component and the payroll processing process component;

the SG employer regulatory compliance process component and the payroll processing process component;

the ZA employer regulatory compliance process component and the payroll processing process component;

the CA employer regulatory compliance process component and the payroll processing process component;

the DE employer regulatory compliance process component and the payroll processing process component;

the compensation management process component and the payroll processing process component;

the US employer regulatory compliance process component and the payroll processing process component;

the AT employer regulatory compliance process component and the payroll processing process component;

the CH employer regulatory compliance process component and the payroll processing process component;

the IN employer regulatory compliance process component and the payroll processing process component;

the NL employer regulatory compliance process component and the payroll processing process component; and the IT employer regulatory compliance process component and the payroll processing process component.

13. The system of claim 12, wherein:
the plurality of process components further includes:
a personnel administration process component that handles administration of personnel changes concerning employee master data and work agreements;
a business partner data management process component that handles management of business partner master data of a company;
an identity management process component that handles identification of individuals in a system landscape and controlling their access by associating user rights and restrictions;
a human capital master data management process component that handles management of work agreements, employments, and human capital master data; and
an expense and reimbursement management process component that handles management and monitoring of expenses incurred by employees, and reimbursement of such expenses to employees; and wherein:
the pair-wise interactions between pairs of the process components further include interactions between:
the personnel administration process component and the business partner data management process component;
the personnel administration process component and the human capital master data management process component;
the business partner data management process component and the identity management process component;
the human capital master data management process component and the expense and reimbursement management process component;

the human capital master data management process component and the time and labor management process component;

the human capital master data management process component and the compensation management process component;

the human capital master data management process component and the employee payroll administration process component;

the human capital master data management process component and the DE employer regulatory compliance process component;

the human capital master data management process component and the US employer regulatory compliance process component;

the human capital master data management process component and the CN employer regulatory compliance process component;

the human capital master data management process component and the FR employer regulatory compliance process component;

the human capital master data management process component and the GB employer regulatory compliance process component;

the human capital master data management process component and the IT employer regulatory compliance process component;

the human capital master data management process component and the AU employer regulatory compliance process component;

the human capital master data management process component and the CA employer regulatory compliance process component;

the human capital master data management process component and the DK employer regulatory compliance process component;

the human capital master data management process component and the NL employer regulatory compliance process component;

the human capital master data management process component and the SG employer regulatory compliance process component; and the human capital master data management process component and the ZA employer regulatory compliance process component.

14. The system of claim 12, wherein:
each of the process components includes one or more business objects; and
none of the business objects of any one of the process components interacts directly with any of the business objects included in any of the other process components.

15. The system of claim 12, wherein none of the business objects included in any one of the process components is included in any of the other process components.

16. The system of claim 12, further comprising a plurality of process agents, each process agent being either an inbound process agent or an outbound process agent, an inbound process agent being operable to receive a message from an inbound operation, an outbound process agent being operable to cause an outbound operation to send a message and each process agent being associated with exactly one process component.

17. The system of claim 12, the system comprising multiple hardware platforms, wherein:
the time and labor management process component, the compensation management process component, the employee payroll administration process component, the DE employer regulatory compliance process component, the US employer regulatory compliance process component, the CN employer regulatory compliance process component, the FR employer regulatory compliance process component, the GB employer regulatory compliance process component, the IT employer regulatory compliance process component, the AU employer regulatory compliance process component, the CA employer regulatory compliance process component, the DK employer regulatory compliance process component, the NL employer regulatory compliance process component, the SG employer regulatory compliance process component, the ZA employer regulatory compliance process component, the AT employer regulatory compliance process component, the CH employer regulatory compliance process component, the IN employer regulatory compliance process component, and the personnel administration process component are deployed on a first hardware platform;

the payroll process component is deployed on a second hardware platform; and the expense and reimbursement management process component is deployed on a third hardware platform.

18. The system of claim 17, wherein each of the first through the third hardware platforms are distinct and separate from each other.

19. A method for developing a computer software application, comprising:
obtaining in a computer system digital data representing an architectural design for a set of processes implementing an end-to-end application process, the design specifying a process component for each process in the set of processes and the design further specifying a set of process component interactions, wherein:
the specified process components include:
a payroll processing process component that handles execution and monitoring of regular and off-cycle payroll processes;
a time and labor management process component that handles management of employees' planned working times, and recording and valuation of work performed and absence times;
a compensation management process component that handles planning and specification of compensation data for employees using appropriate reward strategies based on predefined compensation structures and components;
an employee payroll administration process component that handles administration of employee specific payroll agreements and overview of completed and planned payroll processes;
a DE employer regulatory compliance process component that handles administration of employee data and reporting to authorities that employers in Germany are legally obligated to perform;
a US employer regulatory compliance process component that handles administration of employee data and reporting to authorities that employers in the United States of America are legally obligated to perform;
a CN employer regulatory compliance process component that handles reporting and other administrative activities that employers in China, with respect to employees, are legally obligated to perform;
an FR employer regulatory compliance process component that handles administration of employee data and reporting to authorities that employers in France are legally obligated to perform;

a GB employer regulatory compliance process component that handles administration of employee data and reporting to authorities that employers in the United Kingdom are legally obligated to perform;

an IT employer regulatory compliance process component that handles administration of employee data and reporting to authorities that employers in Italy are legally obligated to perform;

an AU employer regulatory compliance process component that handles activities an employer in Australia is obliged to perform with respect to employees;

a CA employer regulatory compliance process component that handles activities an employer in Canada is obliged to perform with respect to employees;

a DK employer regulatory compliance process component that handles reporting and other administrative activities that an employer in Denmark is obliged to perform with respect to employees;

an NL employer regulatory compliance process component that handles activities an employer in the Netherlands is obliged to perform with respect to employees;

an SG employer regulatory compliance process component that handles activities an employer in Singapore is obliged to perform with respect to employees;

an AT employer regulatory compliance process component that handles the combination of activities an employer in Austria is obliged to perform with respect to employees;

a CH employer regulatory compliance process component that handles the combination of activities an employer in Switzerland is obliged to perform with respect to employees;

an IN employer regulatory compliance process component that handles the combination of activities an employer in India is obliged to perform with respect to employees; and a ZA employer regulatory compliance process component that handles activities an employer in South Africa is obliged to perform with respect to employees; and the process component interactions include interactions between:

the time and labor management process component and the payroll processing process component;

the AU employer regulatory compliance process component and the payroll processing process component;

the FR employer regulatory compliance process component and the payroll processing process component;

the GB employer regulatory compliance process component and the payroll processing process component;

the employee payroll administration process component and the payroll processing process component;

the DK employer regulatory compliance process component and the payroll processing process component;

the CN employer regulatory compliance process component and the payroll processing process component;

the SG employer regulatory compliance process component and the payroll processing process component;

the ZA employer regulatory compliance process component and the payroll processing process component;

the CA employer regulatory compliance process component and the payroll processing process component;

the DE employer regulatory compliance process component and the payroll processing process component;

the compensation management process component and the payroll processing process component;

the US employer regulatory compliance process component and the payroll processing process component;

the AT employer regulatory compliance process component and the payroll processing process component;

the CH employer regulatory compliance process component and the payroll processing process component;

the IN employer regulatory compliance process component and the payroll processing process component;

the NL employer regulatory compliance process component and the payroll processing process component; and the IT employer regulatory compliance process component and the payroll processing process component; and using the design including the specified process components and the specified process component interactions to develop a computer software application to perform the set of processes.

20. The method of claim 19, wherein:

the specified process components further include:

a personnel administration process component that handles administration of personnel changes concerning employee master data and work agreements;

a business partner data management process component that handles management of business partner master data of a company;

an identity management process component that handles identification of individuals in a system landscape and controlling their access by associating user rights and restrictions;

a human capital master data management process component that handles management of work agreements, employments, and human capital master data; and an expense and reimbursement management process component that handles management and monitoring of expenses incurred by employees, and reimbursement of such expenses to employees; and wherein:

the process component interactions further include interactions between:

the personnel administration process component and the business partner data management process component;

the personnel administration process component and the human capital master data management process component;

the business partner data management process component and the identity management process component;

the human capital master data management process component and the expense and reimbursement management process component;

the human capital master data management process component and the time and labor management process component;

the human capital master data management process component and the compensation management process component;

the human capital master data management process component and the employee payroll administration process component;

the human capital master data management process component and the DE employer regulatory compliance process component;

the human capital master data management process component and the US employer regulatory compliance process component;

the human capital master data management process component and the CN employer regulatory compliance process component;

the human capital master data management process component and the FR employer regulatory compliance process component;

the human capital master data management process component and the GB employer regulatory compliance process component;

the human capital master data management process component and the IT employer regulatory compliance process component;

the human capital master data management process component and the AU employer regulatory compliance process component;

the human capital master data management process component and the CA employer regulatory compliance process component;

the human capital master data management process component and the DK employer regulatory compliance process component;

the human capital master data management process component and the NL employer regulatory compliance process component;

the human capital master data management process component and the SG employer regulatory compliance process component; and the human capital master data management process component and the ZA employer regulatory compliance process component.

21. The method of claim 19, wherein each process in the set of processes is a business process transforming a defined business input into a defined business outcome.

22. The method of claim 21, wherein:
obtaining digital data representing the architectural design further comprises editing the design before using the design.

* * * * *